United States Patent
Kobayashi

(10) Patent No.: US 9,235,651 B2
(45) Date of Patent: Jan. 12, 2016

(54) DATA RETRIEVAL APPARATUS, DATA STORAGE METHOD AND DATA RETRIEVAL METHOD

(71) Applicant: FUJITSU LIMITED, Kawasaki-shi, Kanagawa (JP)

(72) Inventor: Fumiya Kobayashi, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 315 days.

(21) Appl. No.: 14/057,784

(22) Filed: Oct. 18, 2013

(65) Prior Publication Data
US 2014/0188893 A1 Jul. 3, 2014

(30) Foreign Application Priority Data
Dec. 28, 2012 (JP) .................. 2012-288075

(51) Int. Cl.
*G06F 17/30* (2006.01)

(52) U.S. Cl.
CPC ...... *G06F 17/30949* (2013.01); *G06F 17/3033* (2013.01)

(58) Field of Classification Search
CPC .......... G06F 17/3033; G06F 17/30949; G06F 17/30336
See application file for complete search history.

(56) References Cited

U.S. PATENT DOCUMENTS

| | | | | |
|---|---|---|---|---|
| 5,893,120 A * | 4/1999 | Nemes | ............... | G06F 17/30949 |
| 6,212,525 B1 * | 4/2001 | Guha | ................ | G06F 17/30949 707/747 |
| 6,275,919 B1 * | 8/2001 | Johnson | ............ | G06F 17/30949 707/E17.036 |
| 7,054,912 B2 | 5/2006 | Kanai et al. | | |

FOREIGN PATENT DOCUMENTS

| | | |
|---|---|---|
| JP | 09-218877 | 8/1997 |
| JP | 2002-268935 | 9/2002 |

OTHER PUBLICATIONS

Stoica, Ion et al. "Chord: A Scalable Peer-to-Peer Lookup Service for Internet Applications", Computer Communication Review, ACM, New York, NY, USA, vol. 31, Issue. 4, Oct. 2001, pp. 149-160.*
Stoica, Ion et al., "Chord: A Scalable Peer-to-Peer Lookup Service for Internet Applications", Computer Communication Review, ACM, New York, NY, US, vol. 31, No. 4, Aug. 27, 2001, pp. 149-160, XP001115753.

(Continued)

*Primary Examiner* — Rehana Perveen
*Assistant Examiner* — Alexander Khong
(74) *Attorney, Agent, or Firm* — Fujitsu Patent Center

(57) ABSTRACT

A computer executes a process including dividing a data set into a plurality of data sets, determining hash functions for the data sets, producing hash coefficient value information for specifying the hash functions and correspondence information between the hash coefficient values and the data sets, and producing hash information for the data sets. In the hash function determination, a hash value is calculated using a candidate hash function based on keys of the data of the data set, and the candidate hash function is determined as the hash function of the data set with regard to which it is decided that all data can be stored into a first address based on the hash value or a second address contiguous to the first address. In the hash information production, the hash information for the data set is produced by storing the data and keys into the first or second address.

20 Claims, 42 Drawing Sheets

(56) References Cited

OTHER PUBLICATIONS

Ratnasamy, Sylvia et al., "A Scalable Content-Addressable Network", Computer Communication Review, ACM, New York, NY, US, Aug. 27, 2001, pp. 161-172, XP002234113.

Zhao, Ben Y. et al., "Tapestry: An Infrastructure for Fault-tolerant Wide-area Location and Routing", Report USB/CSD-01-1141, XX, XX, Apr. 1, 2001, pp. 1-27, XP002995768.

Rowstron, Antony et al., "Pastry: Scalable, distributed object location and routing for large-scale peer-to-peer systems", Microsoft Research, Jan. 1, 2001, XP055110268, Cambridge, UK, Retrieved from the Internet: URL: http://citeseerx.ist.psu.edu/viewdoc/download?doi=10.1.1.28.5987&rep=rep1&type=pdf, [retrieved on Mar. 27, 2014], 20 pages.

Extended European Search Report dated Apr. 3, 2014 for corresponding European Patent Application No. 13190257.9, 9 pages.

Djamal Belazzougui, et al., "Hash, Displace, and Compress", Lecture Notes in Computer Science vol. 5757 (2009), pp. 682-693.

* cited by examiner

FIG. 10

| EMPLOYEE ID | NAME |
| --- | --- |
| 0005 | MAKOTO SATO |
| 0012 | DAISUKE SUZUKI |
| 0049 | NAOKI TAKAHASHI |
| 0090 | TSUYOSHI TANAKA |
| 0106 | RYO ITO |
| 0108 | DAISUKE WATANABE |
| 0110 | SATOSHI YAMAMOTO |
| 0125 | KEN NAKAMURA |
| 0138 | MANABU KOBAYASHI |
| 0141 | TETSUYA KATO |
| 0143 | TAKUYA YOSHIDA |
| 0147 | KAZUYA YAMADA |
| 0149 | TORU SASAKI |
| 0152 | TARO YAMAGUCHI |
| 0155 | TATSUYA MATSUMOTO |
| 0164 | SHO INOUE |
| 0169 | JUN KIMURA |
| 0180 | HIDEKI HAYASHI |
| 0182 | YOHEI SAITO |
| 0188 | HIDEKI SHIMIZU |

FIG. 11

| EMPLOYEE ID | NAME | CRC32 VALUE (HEXADECIMAL) OF EMPLOYEE ID | REMAINDER OBTAINED BY DIVIDING CRC32 VALUE BY 5 |
|---|---|---|---|
| 0005 | MAKOTO SATO | 0x7cf130fd | 1 |
| 0012 | DAISUKE SUZUKI | 0xfb8e941f | 2 |
| 0049 | NAOKI TAKAHASHI | 0x112bb9d2 | 0 |
| 0090 | TSUYOSHI TANAKA | 0xdd597f3b | 1 |
| 0106 | RYO ITO | 0xe43a0b70 | 4 |
| 0108 | DAISUKE WATANABE | 0x03822677 | 0 |
| 0110 | SATOSHI YAMAMOTO | 0x14429f04 | 4 |
| 0125 | KEN NAKAMURA | 0x4f053848 | 2 |
| 0138 | MANABU KOBAYASHI | 0x28af75b4 | 2 |
| 0141 | TETSUYA KATO | 0x1e325bd7 | 1 |
| 0143 | TAKUYA YOSHIDA | 0xf03c3afb | 4 |
| 0147 | KAZUYA YAMADA | 0xf751fee2 | 3 |
| 0149 | TORU SASAKI | 0x10e9d3e5 | 4 |
| 0152 | TARO YAMAGUCHI | 0x9e203b2c | 3 |
| 0155 | TATSUYA MATSUMOTO | 0x0044ae8f | 0 |
| 0164 | SHO INOUE | 0x5c6ecdda | 0 |
| 0169 | JUN KIMURA | 0x22dfb167 | 2 |
| 0180 | HIDEKI HAYASHI | 0xc580244d | 3 |
| 0182 | YOHEI SAITO | 0x2b8e4561 | 1 |
| 0188 | HIDEKI SHIMIZU | 0xcb5bac7f | 3 |

FIG. 12

| DATA SET NUMBER | ID SET |
|---|---|
| 0 | 0108, 0049, 0155, 0164 |
| 1 | 0005, 0090, 0141, 0182 |
| 2 | 0012, 0125, 0138, 0169 |
| 3 | 0147, 0152, 0180, 0188 |
| 4 | 0110, 0149, 0143, 0106 |

FIG. 13

| DATA SET NUMBER | HASH FUNCTION |
|---|---|
| 0 | $f_5(x_n)$ |
| 1 | $f_{11}(x_n)$ |
| 2 | $f_5(x_n)$ |
| 3 | $f_5(x_n)$ |
| 4 | $f_{10}(x_n)$ |

FIG. 14

| INDEX | $R^8$ VALUE | $R^7$ VALUE | $R^6$ VALUE | $R^5$ VALUE | $R^4$ VALUE | $R^3$ VALUE | $R^2$ VALUE | $R^1$ VALUE |
|---|---|---|---|---|---|---|---|---|
| 1 | 62950 | 12590 | 15625 | 3125 | 625 | 125 | 25 | 5 |
| 2 | 41241 | 17796 | 46656 | 7776 | 1296 | 216 | 36 | 6 |
| 3 | 63256 | 37123 | 52114 | 16807 | 2401 | 343 | 49 | 7 |
| 4 | 256 | 32 | 4 | 32768 | 4096 | 512 | 64 | 8 |
| 5 | 55761 | 64449 | 7161 | 59049 | 6561 | 729 | 81 | 9 |
| 6 | 59125 | 38680 | 16975 | 34465 | 10000 | 1000 | 100 | 10 |
| 7 | 59431 | 23276 | 2116 | 29981 | 14641 | 1331 | 121 | 11 |
| 8 | ... | ... | ... | ... | ... | ... | ... | ... |
| 9 | ... | ... | ... | ... | ... | ... | ... | ... |
| 10 | ... | ... | ... | ... | ... | ... | ... | ... |
| 11 | ... | ... | ... | ... | ... | ... | ... | ... |
| 12 | ... | ... | ... | ... | ... | ... | ... | ... |
| 13 | ... | ... | ... | ... | ... | ... | ... | ... |
| 14 | ... | ... | ... | ... | ... | ... | ... | ... |
| 15 | ... | ... | ... | ... | ... | ... | ... | ... |
| 16 | ... | ... | ... | ... | ... | ... | ... | ... |

FIG. 15

| CRC VALUE | HASH FUNCTION ENTITY INDEX |
|---|---|
| 0 | 1 |
| 1 | 7 |
| 2 | 1 |
| 3 | 1 |
| 4 | 6 |

FIG. 16

| EMPLOYEE ID | REMAINDER OBTAINED BY DIVIDING HASH VALUE OF $f_5(x_n)$ BY 5 |
|---|---|
| 0049 | 0 |
| 0108 | 0 |
| 0155 | 1 |
| 0164 | 3 |

FIG. 17

| ADDRESS | EMPLOYEE ID | NAME |
|---|---|---|
| 0 | 0108 | DAISUKE WATANABE |
| 1 | 0049 | NAOKI TAKAHASHI |
| 2 | 0155 | TATSUYA MATSUMOTO |
| 3 | 0164 | SHO INOUE |
| 4 | NONE | NONE |

FIG. 18

| EMPLOYEE ID | REMAINDER OBTAINED BY DIVIDING HASH VALUE OF $f_{11}(x_n)$ BY 5 |
|---|---|
| 0005 | 2 |
| 0090 | 0 |
| 0141 | 2 |
| 0182 | 3 |

FIG. 19

| ADDRESS | EMPLOYEE ID | NAME |
|---|---|---|
| 0 | 0090 | TSUYOSHI TANAKA |
| 1 | NONE | NONE |
| 2 | 0005 | MAKOTO SATO |
| 3 | 0141 | TETSUYA KATO |
| 4 | 0182 | YOHEI SAITO |

FIG. 20

| EMPLOYEE ID | REMAINDER OBTAINED BY DIVIDING HASH VALUE OF $f_5(x_n)$ BY 5 |
|---|---|
| 0012 | 4 |
| 0125 | 3 |
| 0138 | 1 |
| 0169 | 2 |

FIG. 21

| ADDRESS | EMPLOYEE ID | NAME |
|---|---|---|
| 0 | NONE | NONE |
| 1 | 0138 | MANABU KOBAYASHI |
| 2 | 0169 | ATSUSHI KIMURA |
| 3 | 0125 | KEN NAKAMURA |
| 4 | 0012 | DAISUKE SUZUKI |

FIG. 22

| EMPLOYEE ID | REMAINDER OBTAINED BY DIVIDING HASH VALUE OF $f_5(x_n)$ BY 5 |
|---|---|
| 0147 | 3 |
| 0152 | 1 |
| 0180 | 2 |
| 0188 | 2 |

FIG. 23

| ADDRESS | EMPLOYEE ID | NAME |
|---|---|---|
| 0 | NONE | NONE |
| 1 | 0152 | TARO YAMAGUCHI |
| 2 | 0180 | HIDEKI HAYASHI |
| 3 | 0188 | HIDEKI SHIMIZU |
| 4 | 0147 | KAZUYA YAMADA |

FIG. 24

| EMPLOYEE ID | REMAINDER OBTAINED BY DIVIDING HASH VALUE OF $f_{10}(x_n)$ BY 5 |
|---|---|
| 0106 | 0 |
| 0110 | 1 |
| 0143 | 4 |
| 0149 | 0 |

FIG. 25

| ADDRESS | EMPLOYEE ID | NAME |
|---|---|---|
| 0 | 0149 | TORU SASAKI |
| 1 | 0106 | RYO ITO |
| 2 | 0110 | SATOSHI YAMAMOTO |
| 3 | NONE | NONE |
| 4 | 0143 | TAKUYA YOSHIDA |

FIG. 27

| COMPRESSION CHARACTER STRING | COMPRESSION CODE |
|---|---|
| a | A |
| b | B |
| aa | C |
| ab | D |
| ba | E |
| bb | F |
| aaa | G |
| aab | H |
| aba | I |
| abb | J |
| baa | K |
| bab | L |
| bba | M |
| bbb | N |

FIG. 28

| COMPRESSION CHARACTER STRING | COMPRESSION CODE | CRC32 VALUE (HEXADECIMAL) OF COMPRESSION CHARACTER STRING | REMAINDER OBTAINED BY DIVIDING CRC32 VALUE BY 4 |
|---|---|---|---|
| a | A | 0xe8b7be43 | 3 |
| b | B | 0x71beeff9 | 1 |
| aa | C | 0x078a19d7 | 3 |
| ab | D | 0x9e83486d | 1 |
| ba | E | 0x2ca74a14 | 0 |
| bb | F | 0xb5ae1bae | 2 |
| aaa | G | 0xf007732d | 1 |
| aab | H | 0x690e2297 | 3 |
| aba | I | 0xdb2a20ee | 2 |
| abb | J | 0x42237154 | 0 |
| baa | K | 0xf241cd74 | 0 |
| bab | L | 0x6b489cce | 2 |
| bba | M | 0xd96c9eb7 | 3 |
| bbb | N | 0x4065cf0d | 1 |

FIG. 29

| DATA SET NUMBER | COMPRESSION CHARACTER STRING SET |
|---|---|
| 0 | ba, abb, baa |
| 1 | b, ab, aaa, bbb |
| 2 | bb, aba, bab |
| 3 | a, aa, aab, bba |

FIG. 30

| DATA SET NUMBER | HASH FUNCTION |
|---|---|
| 0 | $f_6(x_n)$ |
| 1 | $f_5(x_n)$ |
| 2 | $f_5(x_n)$ |
| 3 | $f_6(x_n)$ |

FIG. 31

| INDEX | $R^8$ VALUE | $R^7$ VALUE | $R^6$ VALUE | $R^5$ VALUE | $R^4$ VALUE | $R^3$ VALUE | $R^2$ VALUE | $R^1$ VALUE |
|---|---|---|---|---|---|---|---|---|
| 1 | 62950 | 12590 | 15625 | 3125 | 625 | 125 | 25 | 5 |
| 2 | 41241 | 17796 | 46656 | 7776 | 1296 | 216 | 36 | 6 |
| 3 | — | — | — | — | — | — | — | — |
| 4 | — | — | — | — | — | — | — | — |
| 5 | — | — | — | — | — | — | — | — |
| 6 | — | — | — | — | — | — | — | — |
| 7 | — | — | — | — | — | — | — | — |
| 8 | — | — | — | — | — | — | — | — |
| 9 | — | — | — | — | — | — | — | — |
| 10 | — | — | — | — | — | — | — | — |
| 11 | — | — | — | — | — | — | — | — |
| 12 | — | — | — | — | — | — | — | — |
| 13 | — | — | — | — | — | — | — | — |
| 14 | — | — | — | — | — | — | — | — |
| 15 | — | — | — | — | — | — | — | — |
| 16 | — | — | — | — | — | — | — | — |

FIG. 32

| CRC VALUE | HASH FUNCTION ENTITY INDEX |
|---|---|
| 0 | 2 |
| 1 | 1 |
| 2 | 1 |
| 3 | 2 |

FIG. 33

| COMPRESSION CHARACTER STRING | REMAINDER OBTAINED BY DIVIDING HASH VALUE OF $f_6(x_n)$ BY 4 |
|---|---|
| ba | 2 |
| abb | 0 |
| baa | 1 |

FIG. 34

| ADDRESS | COMPRESSION CHARACTER STRING | COMPRESSION CODE |
|---|---|---|
| 0 | abb | J |
| 1 | baa | K |
| 2 | ba | E |
| 3 | NONE | NONE |

FIG. 35

| COMPRESSION CHARACTER STRING | REMAINDER OBTAINED BY DIVIDING HASH VALUE OF $f_5(x_n)$ BY 5 |
|---|---|
| b | 2 |
| ab | 0 |
| aaa | 3 |
| bbb | 0 |

FIG. 36

| ADDRESS | COMPRESSION CHARACTER STRING | COMPRESSION CODE |
|---|---|---|
| 0 | ab | D |
| 1 | bbb | N |
| 2 | b | B |
| 3 | aaa | G |
| 4 | NONE | NONE |

FIG. 37

| COMPRESSION CHARACTER STRING | REMAINDER OBTAINED BY DIVIDING HASH VALUE OF $f_5(x_n)$ BY 4 |
|---|---|
| bb | 0 |
| aba | 2 |
| bab | 2 |

FIG. 38

| ADDRESS | COMPRESSION CHARACTER STRING | COMPRESSION CODE |
|---|---|---|
| 0 | bb | F |
| 1 | NONE | NONE |
| 2 | aba | I |
| 3 | bab | L |

FIG. 39

| COMPRESSION CHARACTER STRING | REMAINDER OBTAINED BY DIVIDING HASH VALUE OF $f_6(x_n)$ BY 5 |
|---|---|
| a | 0 |
| aa | 1 |
| aab | 0 |
| bba | 3 |

FIG. 40

| ADDRESS | COMPRESSION CHARACTER STRING | COMPRESSION CODE |
|---|---|---|
| 0 | a | A |
| 1 | aab | H |
| 2 | aa | C |
| 3 | bba | M |
| 4 | NONE | NONE |

DATA RETRIEVAL APPARATUS, DATA STORAGE METHOD AND DATA RETRIEVAL METHOD

CROSS-REFERENCE TO RELATED APPLICATION

This application is based upon and claims the benefit of priority of the prior Japanese Patent Application No. 2012-288075, filed on Dec. 28, 2012, the entire contents of which are incorporated herein by reference.

FIELD

The embodiments discussed herein are related to a data retrieval apparatus, a data storage method and a data retrieval method.

BACKGROUND

Conventionally, as one of data retrieval methods, a data retrieval method that uses a hash table is available.

Here, the hash table is one kind of a table type data structure that uses a hash function as measures for determining a position of a table into which data is to be stored or measures for determining a position of the table from which data is to be acquired.

A data retrieval method that uses a hash table is advantageous in that the data retrieval efficiency is high, namely, the time required to retrieve retrieval target data or to decide that no retrieval target data exists is short in comparison with other data retrieval methods (for example, a binary tree search method).

On the other hand, the data retrieval method that uses a hash table uses a hash table produced by storing data into a storage position specified based on a hash value calculated by a hash function. The hash value calculated by the hash function may be equal between different data, and, in this case, the data retrieval efficiency degrades depending upon in what manner the data are stored into a hash table and retrieved.

On the other hand, it seems a possible idea to use a perfect hash function that guarantees that hash values do not overlap with each other among all data stored in the hash table. When a hash table produced using a perfect hash function is used, since storage positions do not overlap with each other among different data, a storage position can be specified uniquely upon data retrieval, and the data retrieval efficiency is the highest in theory and the highest data retrieval efficiency is guaranteed.

However, it is not easy to determine a perfect hash function for a given data set. Specifically, it is not easy to determine a perfect hash function for a large-scale data set. For example, the calculation cost when a perfect hash function is calculated by a brute force method increases exponentially with respect to increase of the number of data.

On the other hand, as a method for suppressing the calculation cost when a perfect hash function is calculated, a CHD algorithm is available wherein a large-scale data set is divided into a plurality of small-scale data sets and an individual perfect hash function is calculated for each of the plurality of small-scale data sets.

SUMMARY

According to an aspect of the embodiments, a non-transitory computer-readable recording medium having stored therein a data storage program for causing a computer to execute a data storage process includes dividing a data set into a plurality of data sets; determining a plurality of hash functions corresponding to the plurality of data sets; producing hash coefficient value information including values of a plurality of hash coefficients that specify the plurality of hash functions; producing correspondence information that associates values of the plurality of hash coefficients that specify the plurality of hash functions and the plurality of data sets with each other; and producing a plurality of hash information corresponding to the plurality of data sets; wherein the determining the plurality of hash functions includes calculating, for each of the data sets, a hash value using a candidate hash function based on keys of a plurality of data included in the data set and deciding whether or not all of the plurality of data can be stored into a first storage position specified based on the hash value or a second storage position contiguous to the first storage position; and determining the candidate hash function as the hash function corresponding to the data set with regard to which it is decided that all of the plurality of data can be stored into the first storage position or the second storage position; and the producing the plurality of hash information includes producing the hash information for the data set by storing, for each of the data sets, the data and the keys into the first storage position specified based on the hash value calculated using the hash function corresponding to the data set or the second storage position based on the keys of the plurality of data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 10 is a view illustrating a data set of a storage target in an employee ID retrieval system to which the data retrieval apparatus according to the present embodiment is applied;

FIG. 11 is a view illustrating a CRC32 value of each data in a retrieval target data set in the employee ID retrieval system to which the data retrieval apparatus according to the present embodiment is applied and a value of the remainder when the CRC32 value is divided by "5" (number of small-scale data sets);

FIG. 12 is a view illustrating a result when a data set of a retrieval target in the employee ID retrieval system to which the data retrieval apparatus according to the present embodiment is applied is divided into a plurality of small-scale data sets;

FIG. 13 is a view illustrating a result of allocation of a hash function to each of small-scale data sets in the employee ID retrieval system to which the data retrieval apparatus according to the present embodiment is applied;

FIG. 14 is a view illustrating a hash function entity management table (hash coefficient value table) in the employee ID retrieval system to which the data retrieval apparatus according to the present embodiment is applied;

FIG. 15 is a view illustrating a hash function index table (correspondence table) in the employee ID retrieval system to which the data retrieval apparatus according to the present embodiment is applied;

FIG. 16 is a view illustrating a value of the remainder when a hash value of each data included in a data set number "0" in the employee ID retrieval system to which the data retrieval apparatus according to the present embodiment is applied is divided by "5" (size of a hash table).

FIG. 17 is a view illustrating a result when each data included in the data set number "0" in the employee ID retrieval system to which the data retrieval apparatus according to the present embodiment is applied are stored in a hash table corresponding to the data set number "0";

FIG. 18 is a view illustrating a value of the remainder when a hash value of each data included in a data set number "1" in the employee ID retrieval system to which the data retrieval apparatus according to the present embodiment is applied is divided by "5" (size of a hash table);

FIG. 19 is a view illustrating a result when each data included in the data set number "1" in the employee ID retrieval system to which the data retrieval apparatus according to the present embodiment is applied is stored in a hash table corresponding to the data set number "1";

FIG. 20 is a view illustrating a value of the remainder when a hash value of each data included in a data set number "2" in the employee ID retrieval system to which the data retrieval apparatus according to the present embodiment is applied is divided by "5" (size of a hash table);

FIG. 21 is a view illustrating a result when each data included in the data set number "2" in the employee ID retrieval system to which the data retrieval apparatus according to the present embodiment is applied is stored in a hash table corresponding to the data set number "2";

FIG. 22 is a view illustrating a value of the remainder when a hash value of each data included in a data set number "3" in the employee ID retrieval system to which the data retrieval apparatus according to the present embodiment is applied is divided by "5" (size of a hash table);

FIG. 23 is a view illustrating a result when each data included in the data set number "3" in the employee ID retrieval system to which the data retrieval apparatus according to the present embodiment is applied is stored in a hash table corresponding to the data set number "3";

FIG. 24 is a view illustrating a value of the remainder when a hash value of each data included in a data set number "4" in the employee ID retrieval system to which the data retrieval apparatus according to the present embodiment is applied is divided by "5" (size of a hash table);

FIG. 25 is a view illustrating a result when each data included in the data set number "4" in the employee ID retrieval system to which the data retrieval apparatus according to the present embodiment is applied is stored in a hash table corresponding to the data set number "4";

FIG. 27 is a view illustrating a data set of a storage target in a dictionary type data compression system to which the data retrieval apparatus according to the present embodiment is applied;

FIG. 28 is a view illustrating a CRC32 value of each data in a data set of a storage target in the dictionary type data compression system to which the data retrieval apparatus according to the present embodiment is applied and a remainder value when the CRC32 value is divided by "4" (number of small-scale data sets);

FIG. 29 is a view illustrating a result when the storage target data set in the dictionary type data compression system to which the data retrieval apparatus according to the present embodiment is applied is divided into a plurality of small-scale data sets;

FIG. 30 is a view illustrating an allocation result of a hash function to each of the small-scale data sets in the dictionary type data compression system to which the data retrieval apparatus according to the present embodiment is applied;

FIG. 31 is a view illustrating a hash function entity management table (hash coefficient value table) in the dictionary type data compression system to which the data retrieval apparatus according to the present embodiment is applied;

FIG. 32 is a view illustrating a hash function index table (correspondence table) in the dictionary type data compression system to which the data retrieval apparatus according to the present embodiment is applied;

FIG. 33 is a view illustrating a value of the remainder when a hash value of each data included in a data set number "0" in the dictionary type data compression system to which the data retrieval apparatus according to the present embodiment is applied is divided by "4" (size of a hash table);

FIG. 34 is a view depicting a result when each data included in the data set number "0" in the dictionary type data compression system to which the data retrieval apparatus according to the present embodiment is applied is stored in a hash table corresponding to the data set number "0";

FIG. 35 is a view illustrating a value of the remainder when a hash value of each data included in a data set number "1" in the dictionary type data compression system to which the data retrieval apparatus according to the present embodiment is applied is divided by "5" (size of a hash table);

FIG. 36 is a view illustrating a result when each data included in the data set number "1" in the dictionary type data compression system to which the data retrieval apparatus according to the present embodiment is applied is stored in a hash table corresponding to the data set number "1";

FIG. 37 is a view illustrating a value of the remainder when a hash value of each data included in a data set number "2" in the dictionary type data compression system to which the data retrieval apparatus according to the present embodiment is applied is divided by "4" (size of a hash table);

FIG. 38 is a view illustrating a result when each data included in the data set number "2" in the dictionary type data compression system to which the data retrieval apparatus according to the present embodiment is applied is stored in a hash table corresponding to the data set number "2";

FIG. 39 is a view illustrating a value of the remainder when a hash value of each data included in a data set number "3" in the dictionary type data compression system to which the data retrieval apparatus according to the present embodiment is applied is divided by "5" (size of a hash table);

FIG. 40 is a view depicting a result when each data included in the data set number "3" in the dictionary type data compression system to which the data retrieval apparatus according to the present embodiment is applied is stored in a hash table corresponding to the data set number "3";

DESCRIPTION OF EMBODIMENTS

Incidentally, in the CHD algorithm described above, as an individual perfect hash function corresponding to each of a plurality of small-scale data sets, a perfect hash function defined by two hash functions f1 (x) and f2 (x) and two operators α and β, namely, an expression x=f1 (x)+αf2 (x)+β, is determined, and a hash value x is calculated using the perfect hash function. Then, data is stored based on the hash value calculated by the perfect hash function to produce a hash table. However, much time is required for determination of the perfect hash function, calculation of the hash value and production of the hash table. Therefore, time is required for storage of the data and the data storage speed decreases.

Further, in the CHD algorithm described above, the operators α and β of the individual perfect hash functions corresponding to the plurality of small-scale data sets are compressed and retained, and the operators α and β compressed upon data retrieval are decompressed to used as original operators. Then, hash values are calculated by the perfect hash functions described above using the original operators, and data is retrieved using the calculated hash values. However, time is required for the calculation of the hash values. Therefore, time is required for retrieval of data and the data retrieval speed is low.

Therefore, it is desired to enhance the data storage speed and the data retrieval speed while degradation of the data retrieval efficiency is suppressed as far as possible.

In the following, a data storage program, a data retrieval program, a data retrieval apparatus, a data storage method and a data retrieval method according to an embodiment of the present disclosure are described with reference to the drawings of FIGS. 1 to 42.

The data retrieval apparatus according to the present embodiment is provided in an information processing apparatus such as, for example, a server and is used to perform storage and retrieval of data.

First, a hardware configuration of an information processing apparatus including the present data retrieval apparatus is described with reference to FIG. 2.

Figure 2:
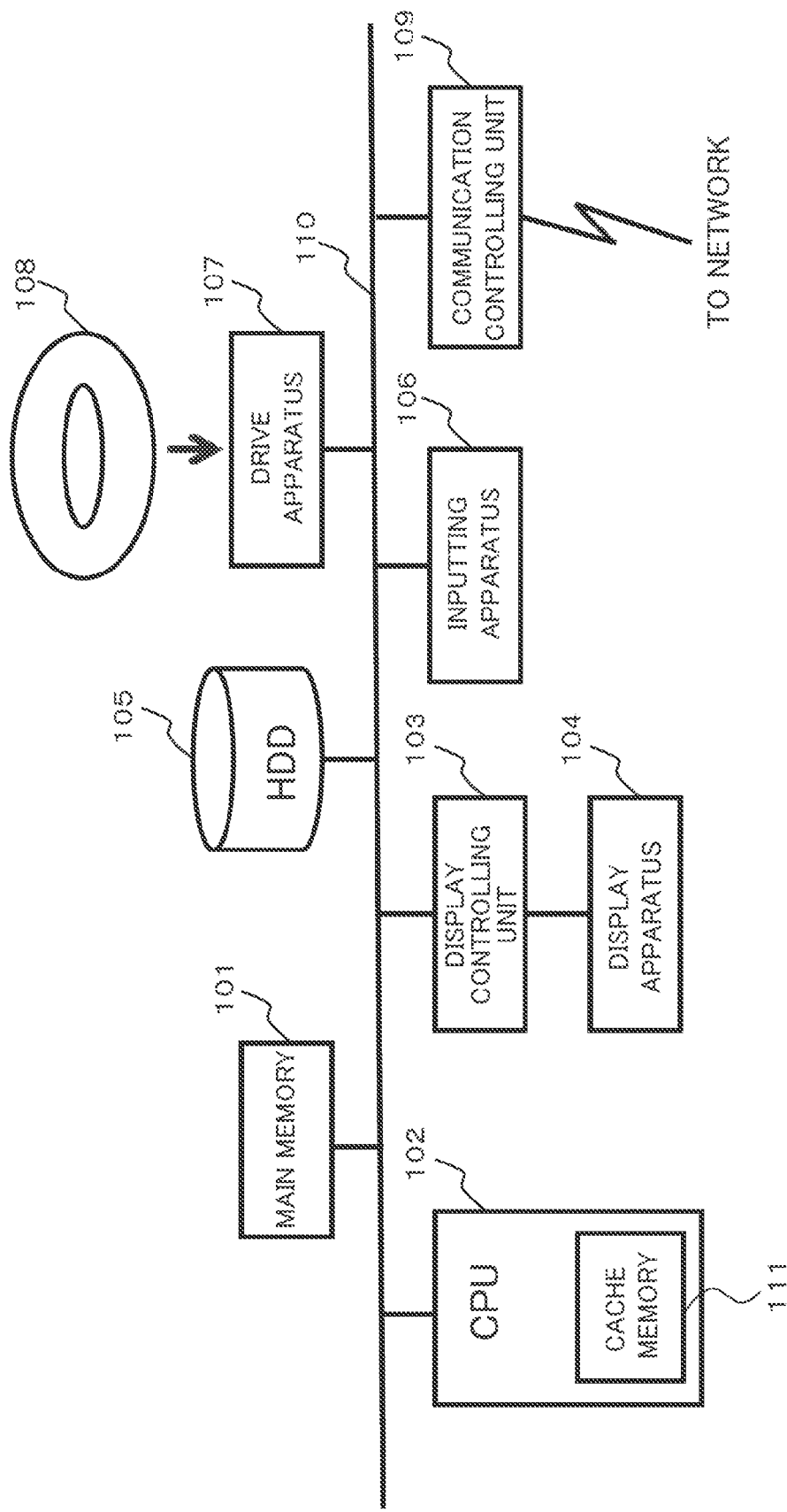
FIG. 2 is a view depicting a hardware configuration of an information processing apparatus including the data retrieval apparatus according to the present embodiment.

The information processing apparatus including the present data retrieval apparatus can be implemented using a computer such as, for example, a server and has a hardware configuration that includes a CPU (Central Processing Unit) 102, a main memory 101, a communication controlling unit 109, an inputting apparatus 106, a display controlling unit 103, a display apparatus 104, a storage apparatus 105 and a drive apparatus 107 for a portable type recording medium 108, for example, as depicted in FIG. 2. The components mentioned are connected to each other through a bus 110. It is to be noted that the hardware configuration of the present apparatus is not limited to this.

Here, the CPU 102 controls the entire computer and reads out a program into the main memory 101 and executes the program to perform processes necessary for the information processing apparatus including the data retrieval apparatus. Further, the CPU 102 includes a high-speed accessible cache memory 111 having smaller capacitance than the main memory 101 therein. As the cache memory 111, for example, an SRAM is used. The cache memory 111 temporarily stores data that are frequently accessed when execution of a program or the like is performed. This is hereinafter referred to as CPU cache or CPU cache memory.

The main memory 101 temporarily stores a program or data therein when execution of a program or the like is to be performed. As the main memory 101, for example, a DRAM is used.

The communication controlling unit 109 (communication interface) is used for communicating with a different apparatus through a network such as, for example, a LAN or the Internet. The communication controlling unit 109 may be incorporated originally in a computer, or may be an NIC (Network Interface Card) attached to the computer later.

The inputting apparatus 106 is a pointing device such as, for example, a mouse or a key board.

The display apparatus 104 is a display unit such as, for example, a liquid crystal display unit.

The display controlling unit 103 performs control for causing the display apparatus 104 to display, for example, a result of a process or the like.

It is to be noted that the inputting apparatus 106 and the display apparatus 104 may be an inputting apparatus and an outputting apparatus provided in a different computer connected to a network.

The storage apparatus 105 is, for example, a hard disk drive (HDD), and various programs and various data are stored in the storage apparatus 105. In the present embodiment, in the storage apparatus 105, a data storage program and a data retrieval program hereinafter described are stored and a large-scale data set hereinafter described is stored. It is to be noted that, for example, a ROM (Read Only Memory) is provided separately from the storage apparatus 105, and various programs and various data may be stored in the ROM.

The drive apparatus 107 is provided for accessing to the storage contents of the portable recording medium 108 such as, for example, an optical disk or a magneto-optical disk.

In the computer having such a hardware configuration as described above, the CPU 102 reads out the data storage program or the data retrieval program stored in the storage apparatus 105 into the main memory 101 and executes the readout program to implement various functions of the present data retrieval apparatus, namely, such functions as a data storage processing function, a data retrieval processing function, a hash coefficient value table storage function, a correspondence table storage function and a hash table storage function.

Figure 1:
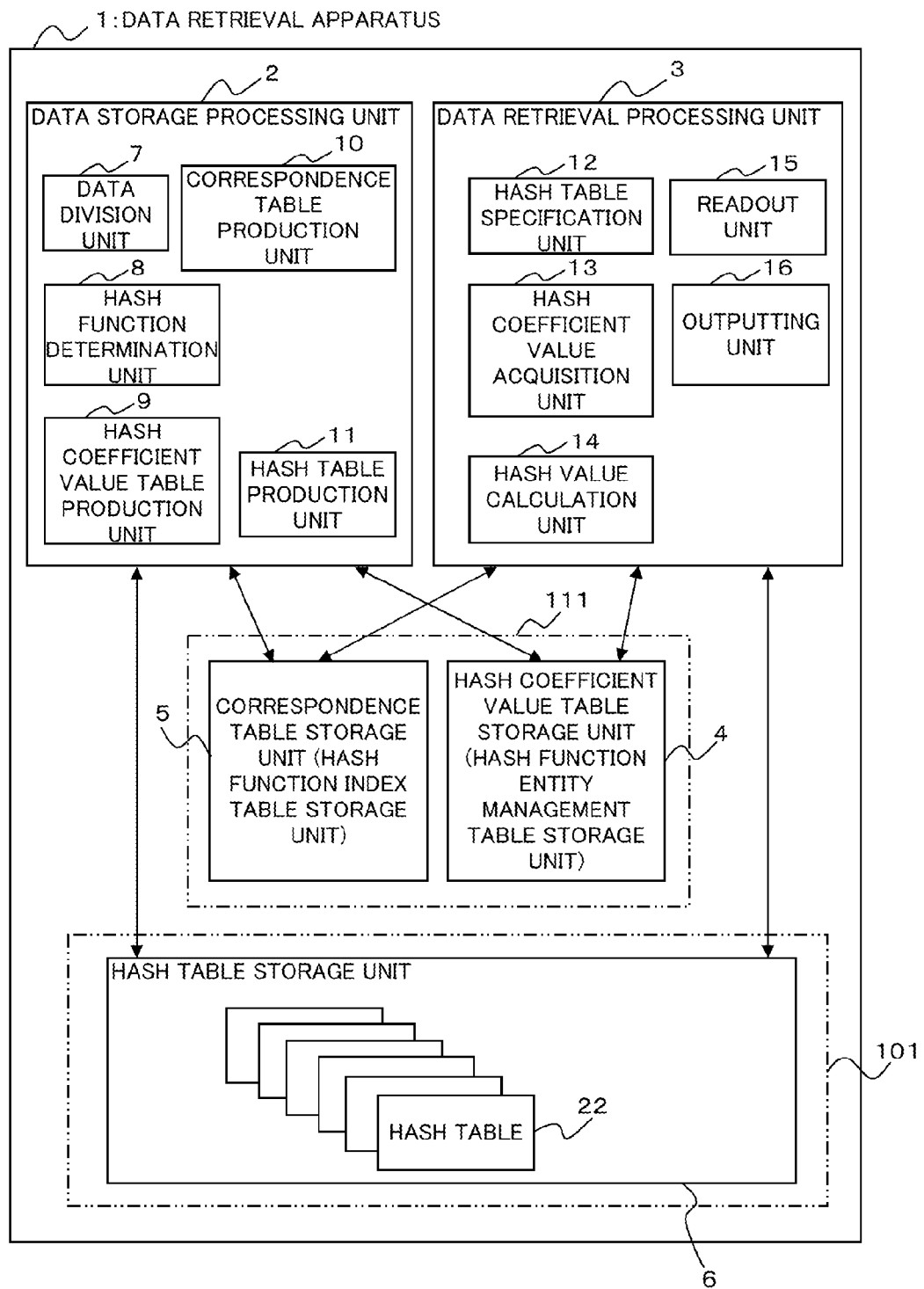
FIG. 1 is a view depicting a configuration of data retrieval apparatus according to an embodiment.

To this end, as depicted in FIG. 1, the present data retrieval apparatus 1 includes a data storage processing unit 2, a data retrieval processing unit 3, a hash coefficient value table storage unit 4, a correspondence table storage unit 5 and a hash table storage unit 6.

Here, the data storage processing unit 2 includes a data division unit 7, a hash function determination unit 8, a hash coefficient value table production unit 9, a correspondence table production unit 10 and a hash table production unit 11.

The data division unit 7 divides a data set into a plurality of data sets.

The hash function determination unit 8 determines a plurality of hash functions individually for the plurality of data sets.

sets. Specifically, the hash function determination unit 8 calculates, for each of the data sets, a hash value by a candidate hash function based on keys of a plurality of data included in the data set and decides whether or not all of the plurality of data can be stored into a first storage position specified based on the hash value or a second storage position contiguous to the first storage position. Then, the hash function determination unit 8 determines a candidate hash function as a hash function for the data set with regard to which it is decided that all of the plurality of data can be stored into the first storage position or the second storage position. Here, the hash function determination unit 8 preferably uses, as a candidate hash function where a key string (key character string) $\{x_1, x_2, x_3, \ldots, x_n\}$ of data is represented as $x_K$ ($1 \leq K \leq n$), a hash function specified by a value of a hash coefficient R ($1 \leq R \leq 256$) and included in a function group represented by $f_R(x_K)=f_R(x_{K-1}) \times R + x_K$ [where $f_R(x_0)=R_0$ ($R_0$ is an initial value)]. Further, the hash function determination unit 8 preferably determines, when two or more data sets with regard to which it is decided that all of the plurality of data can be stored into the first storage position or the second storage position are found, the candidate hash function as a hash function for each of the two or more data sets. Further, the hash function determination unit 8 preferably determines 16 or 32 hash functions as a plurality of hash functions individually for the plurality of data sets.

The hash coefficient value table production unit 9 produces a hash coefficient value table 20 (refer to FIG. 6) for storing values of a plurality of hash coefficients for specifying the plurality of hash functions therein. Here, the hash coefficient value table production unit 9 stores the values of a plurality of hash coefficients for individually specifying the plurality of hash functions into the CPU cache memory 111 to produce the hash coefficient value table 20 (refer to FIG. 6) in the CPU cache memory 111. Consequently, the hash coefficient value table 20 (refer to FIG. 6) is retained in the CPU cache memory 111 and the hash coefficient value table storage unit 4 that stores the hash coefficient value table 20 (refer to FIG. 6) is produced in the CPU cache memory 111. In this manner, the hash coefficient value table production unit 9 preferably produces the hash coefficient value table 20 (refer to FIG. 6) having an information amount which can be retained in the CPU cache memory 111. It is to be noted that, since the value of the hash coefficient is the entity of the hash function, the hash coefficient value table 20 (refer to FIG. 6) is hereinafter referred to also as hash function entity management table or hash coefficient value information. Further, the hash coefficient value table production unit 9 is hereinafter referred to also as hash function entity management table production unit or hash coefficient value information production unit.

The correspondence table production unit 10 produces a correspondence table 21 (refer to FIG. 6) that associates a plurality of hash coefficient values that individually specify a plurality of hash functions and a plurality of data sets with each other. Here, the correspondence table production unit 10 stores a correspondence table 21 (refer to FIG. 6) that associates a plurality of hash coefficient values that individually specify a plurality of hash functions and a plurality of data sets with each other into the CPU cache memory 111 to produce a correspondence table 21 (refer to FIG. 6) in the CPU cache memory 111. Consequently, the correspondence table 21 (refer to FIG. 6) is retained in the CPU cache memory 111 and the correspondence table storage unit 5 that stores the correspondence table 21 (refer to FIG. 6) is produced in the CPU cache memory 111. In this manner, the correspondence table production unit 10 preferably produces the correspondence table 21 (refer to FIG. 6) having an information amount capable of being retained in the CPU cache memory 111. Further, the correspondence table production unit 10 preferably produces, when a candidate hash function is determined as a hash function for each of the two or more data sets, a correspondence table that associates a hash coefficient value that specifies one hash function and two or more data sets with each other. Further, the correspondence table production unit 10 preferably produces, when 16 or 32 hash functions are to be determined as a plurality of hash functions for a plurality of data sets, a correspondence table that associates a plurality of hash coefficient values that specify a plurality of hash functions and a plurality of data sets with each other and includes a plurality of indexes configured from 4 bits or 5 bits. It is to be noted that the correspondence table 21 (refer to FIG. 6) is hereinafter referred to as hash function index table or correspondence information. Further, the correspondence table production unit 10 is hereinafter referred to as hash function index table production unit or correspondence information production unit.

The hash table production unit 11 produces a plurality of hash tables 22 individually for a plurality of data sets. Specifically, the hash table production unit 11 stores, for each data set, data and keys into a first storage position specified based on a hash value calculated by a hash function for the data set based on keys of the plurality of data or a second storage position to produce a hash table 22 for the data set. It is to be noted that the hash table 22 is hereinafter referred to also as hash information. Further, the hash table production unit 11 is hereinafter referred to also as hash information production unit.

The data retrieval processing unit 3 includes a hash table specification unit 12, a hash coefficient value acquisition unit 13, a hash value calculation unit 14, a readout unit 15 and an outputting unit 16.

The hash table specification unit 12 specifies one hash table 22 that stores one data set including retrieval target data based on a key of retrieval target data from among a plurality of hash tables 22 that store a plurality of data sets divided from a data set. It is to be noted that the hash table specification unit 12 is hereinafter referred to also as hash information specification unit.

The hash coefficient value acquisition unit 13 acquires a value of one hash coefficient that specifies one hash function corresponding to one data set using the correspondence table 21 (refer to FIG. 6) that associates a plurality of data sets and values of hash coefficients that individually specify a plurality of hash functions with each other and the hash coefficient value table 20 (refer to FIG. 6) that stores the values of the plurality of hash coefficients that individually specify the plurality of hash functions. In this instance, the correspondence table 21 and the hash coefficient value table 20 (refer to FIG. 6) preferably have an information amount that can be retained in the CPU cache memory 111. Further, the correspondence table preferably associates a value of a hash coefficient that specifies one hash function and two or more data sets with each other. Further, the correspondence table preferably includes a plurality of indexes that associates a plurality of data sets and values of hash coefficient that individually specify a plurality of hash functions and the plurality of indexes are preferably configured from 4 bits or 5 bits. Further, the plurality of hash functions are preferably specified, where a key string (key character string) $\{x_1, x_2, x_3, \ldots, x_n\}$ of data is represented as $x_K$ ($1 \leq K \leq n$), by a value of a hash coefficient R ($1 \leq R \leq 256$) and included in a function group represented by $f_R(x_K)=f_R(x_{K-1}) \times R + x_K$ [where $f_R(x_0)=R_0$ ($R_0$ is an initial value)]. Further, the plurality of hash functions preferably are 16 or 32 hash functions.

The hash value calculation unit 14 calculates a hash value by one hash function using a key of retrieval target data and a value of one hash coefficient.

The readout unit 15 reads out data and keys stored in a first storage position specified based on a hash value and a second storage position contiguous to the first storage position from one hash table 22.

The outputting unit 16 outputs, when it is decided that a key read out from the first storage position or the second storage position coincides with the key of retrieval target data, data associated with the key decided to be coincident as retrieval target data.

The hash coefficient value table storage unit 4 stores a hash coefficient value table 20 (refer to FIG. 6) that stores values of a plurality of hash coefficients that individually specify a plurality of hash functions. In particular, the hash coefficient value table storage unit 4 stores a hash coefficient value table 20 (refer to FIG. 6) produced by the hash coefficient value table production unit 9 described hereinabove. It is to be noted that, since the value of a hash coefficient is the entity of the hash function, the hash coefficient value table storage unit 4 is referred to also as hash function entity management table storage unit. Further, the hash coefficient value table storage unit 4 is referred to also as hash coefficient value information storage unit. In the present embodiment, part of the storage area of the CPU cache memory 111 is used as the hash coefficient value table storage unit 4. In other words, the hash coefficient value table 20 (refer to FIG. 6) produced by the hash coefficient value table production unit 9 described above is retained in the CPU cache memory 111.

The correspondence table storage unit 5 stores a correspondence table 21 (refer to FIG. 6) that associates values of a plurality of hash coefficients that individually specify a plurality of hash functions and a plurality of data sets with each other. In short, the correspondence table storage unit 5 stores a correspondence table 21 (refer to FIG. 6) produced by the correspondence table production unit 10 described hereinabove. It is to be noted that the correspondence table storage unit 5 is referred to also as hash function index table storage unit or correspondence information storage unit. In the present embodiment, part of the storage area of the CPU cache memory 111 is used as the correspondence table storage unit 5. In other words, a correspondence table 21 (refer to FIG. 6) produced by the correspondence table production unit 10 described hereinabove is retained in the CPU cache memory 111.

The hash table storage unit 6 stores a plurality of hash tables 22 (hash table set) individually for a plurality of data sets. In particular, the hash table storage unit 6 stores a plurality of hash tables 22 produced by the hash table production unit 11 described hereinabove. It is to be noted that the hash table storage unit 6 is referred to also as hash information storage unit. In the present embodiment, part of the storage area of the main memory 101 is used as the hash table storage unit 6. In other words, a plurality of hash tables 22 produced by the hash table production unit 11 are retained in the main memory 101.

Now, processes (data storage method; data retrieval method) executed in accordance with a data storage program or a data retrieval program read in the main memory 101 by the CPU 102 in the present data retrieval apparatus are described with reference to FIGS. 3 to 9.

First, processes by the data storage processing unit 2 provided in the present data retrieval apparatus, namely, processes (data storage method) executed in accordance with the data storage program read in the main memory 101 by the CPU 102 in the data retrieval apparatus 1 are described with reference to FIGS. 3 to 8.

Here, if the data storage processing unit 2 receives a storage request for a data set, then it stores the data set in the following procedure into a hash table 22 (hash information) produced in the main memory 101.

Figure 3:
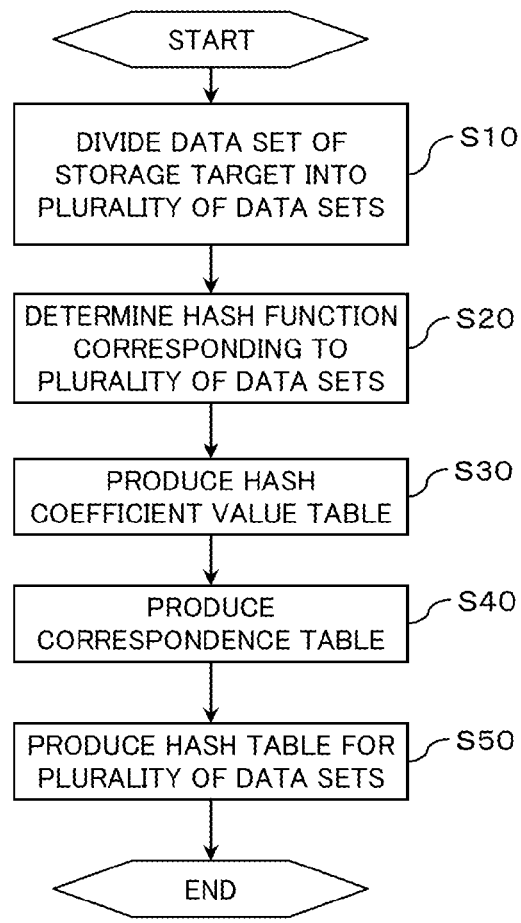
FIGS. 3 to 5 are flow charts illustrating processes (data storage method) by a data storage processing unit (data storage program) provided in the data retrieval apparatus according to the present embodiment.

First, when the data storage processing unit 2 receives a data set of a storage object, as illustrated in FIG. 3, it causes the data division unit 7 thereof to divide the data set of the storage target into a plurality of data sets (step S10).

Here, the data storage processing unit 2 causes the data division unit 7 thereof to divide the large-scale data set of the storage target into a plurality of small-scale data sets. For example, a plurality of data that configure the large-scale data set are divided into a plurality of small-scale data sets such that each of the small-scale data sets includes four data in average. In this instance, where the total number of data that configure the large-scale data set to be stored is n, the number m of small-scale data sets may be determined, for example, by ROUND(n÷4). In particular, a CRC32 value of a key of each of the plurality of data that configure the large-scale data set of the storage target is calculated, and a value of the remainder (CRC value) when each calculated CRC32 value is divided by the number m of the small-scale data sets is calculated. Then, the large-scale data set including the n data is divided into m small-scale data sets such that data that have an equal calculated CRC value are included in the same small-scale data set. In other words, the calculated CRC values are used as identification numbers (data set numbers) of the m small-scale data sets to divide the large-scale data set including the n data into m small-scale data sets. For example, where a CPU that supports an SSE4.2 extended instruction set is used, the large-scale data set can be divided at a high speed into a plurality of small-scale data sets using a CRC32c operation instruction (built-in function name: crc32) built in as hardware.

Then, the data storage processing unit 2 causes the hash function determination unit 8 thereof to determine a plurality of hash functions individually for the plurality of data sets (step S20). In other words, a plurality of hash functions to be used for production of hash tables 22 individually for the plurality of data sets are determined. Specifically, the data storage processing unit 2 causes the hash function determination unit 8 thereof to calculate, for each data set, a hash value by a candidate hash function based on a key of each of the plurality of data included in the data set. Then, it is decided whether or not all of the plurality of data can be stored into a first storage position specified based on the hash value or a second storage position contiguous to the first storage position. Then, a candidate hash function is determined as a hash function for the data set with regard to which it has been decided that all of the plurality of data can be stored into the first storage position specified based on the hash value or the second storage position contiguous to the first storage position. Further, when two or more data sets with regard to which it is decided that all of the plurality of data can be stored into the first storage position or the second storage position are found, the candidate hash function is determined as a hash function for each of the two or more data sets.

Figure 6:
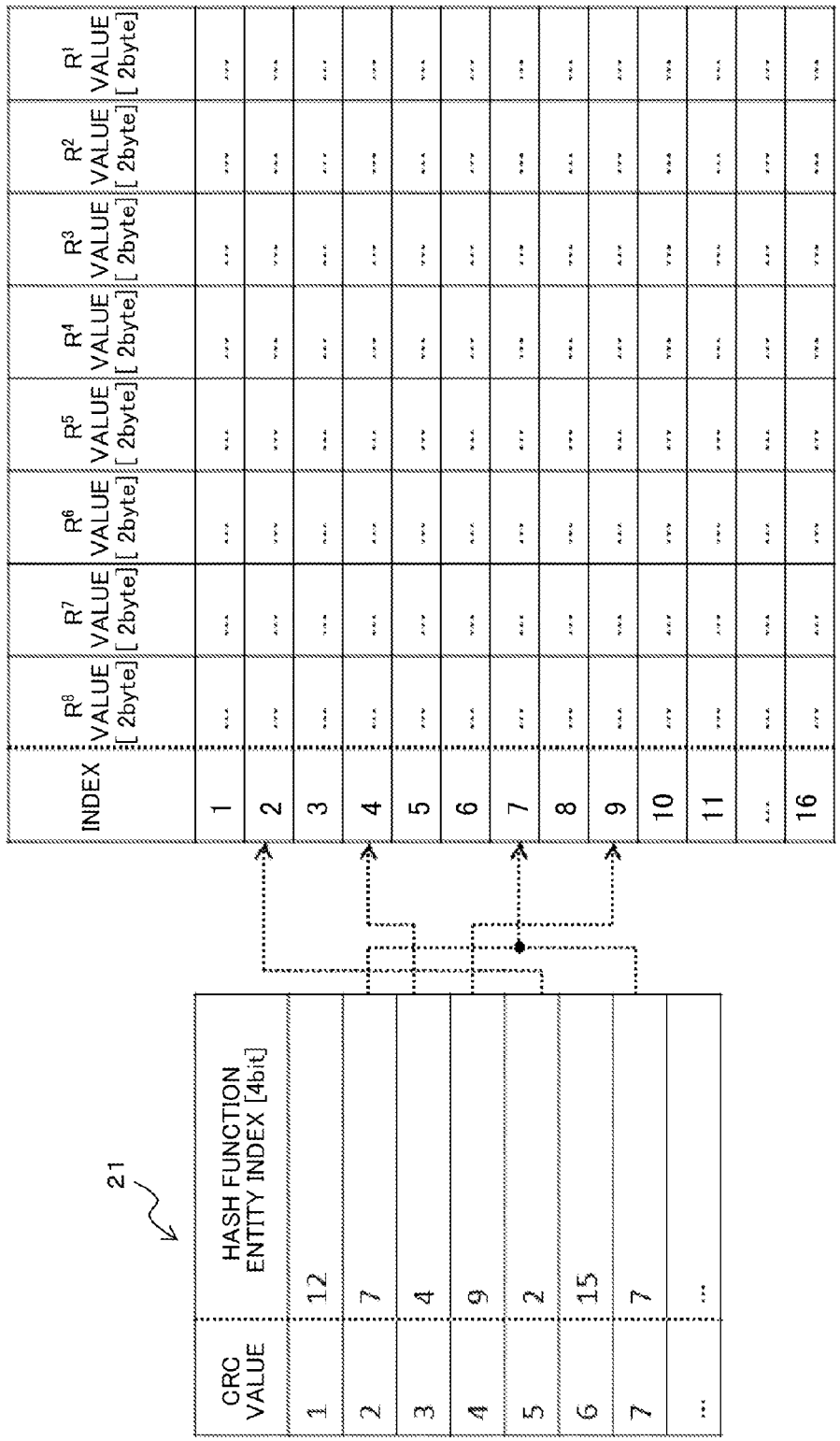
FIG. 6 is a schematic view illustrating a hash function index table (correspondence table) and a hash function entity management table (hash coefficient value table) provided in the data retrieval apparatus according to the present embodiment.

Then, the data storage processing unit 2 causes the hash coefficient value table production unit 9 (hash function entity management table production unit, hash coefficient value information production unit) thereof to produce a hash coefficient value table 20 (hash function entity management table; hash coefficient value information; refer to FIG. 6) that stores values of a plurality of hash coefficients that individually specify the plurality of hash functions (step S30). Here, the data storage processing unit 2 causes the hash coefficient value table production unit 9 thereof to store the values of the plurality of hash coefficients that individually specify the plurality of hash functions into the CPU cache memory 111 to produce a hash coefficient value table 20 (refer to FIG. 6) in the CPU cache memory 111. Consequently, the hash coefficient value table 20 (refer to FIG. 6) is retained in the CPU cache memory 111, and the hash coefficient value table storage unit 4 (hash coefficient value information storage unit) in which the hash coefficient value table 20 (refer to FIG. 6) is stored is produced in the CPU cache memory 111. In this manner, the data storage processing unit 2 preferably causes the hash coefficient value table production unit 9 thereof to produce a hash coefficient value table 20 (refer to FIG. 6) of an information amount that can be retained in the CPU cache memory 111.

Then, the data storage processing unit 2 causes the correspondence table production unit 10 (hash function index table production unit; correspondence information production unit) thereof to produce a correspondence table 21 (hash function index table; correspondence information; refer to FIG. 6) that associates values of the plurality of hash coefficients that individually specify the plurality of hash functions and the plurality of data sets with each other (step S40). Here, the data storage processing unit 2 causes the correspondence table production unit 10 thereof to store the correspondence table 21 (refer to FIG. 6) that associates the values of the plurality of hash coefficients that individually specify the plurality of hash functions and the plurality of data sets with each other into the CPU cache memory 111 to produce the correspondence table 21 (refer to FIG. 6) in the CPU cache memory 111. Consequently, the correspondence table 21 (refer to FIG. 6) is retained in the CPU cache memory 111, and a correspondence table storage unit 5 (correspondence information storage unit) for storing the correspondence table 21 (refer to FIG. 6) is produced in the CPU cache memory 111. In this manner, preferably the data storage processing unit 2 causes the correspondence table production unit 10 thereof to produce the correspondence table 21 (refer to FIG. 6) of an information amount that can be retained in the CPU cache memory 111. Further, when the data storage processing unit 2 determines a candidate hash function as a hash function for individual ones of two or more data sets, preferably a correspondence table that associates a value of a hash coefficient that specifies one hash function and two or more data sets is produced by the correspondence table production unit 10.

Here, a case in which a process for determining a plurality of hash functions (step S20), a process for producing a hash coefficient value table (step S30) and a process for producing a correspondence table (step S40) are performed in parallel and 16 hash functions are allocated to a plurality of small-scale data sets is taken as an example and described particularly below with reference to FIG. 4.

It is to be noted here that "i" is successively incremented by one from "1" to "16" ($1 \leq i \leq 16$) to determine 16 hash functions that individually correspond to the index numbers 1 to 16.

Figure 4:
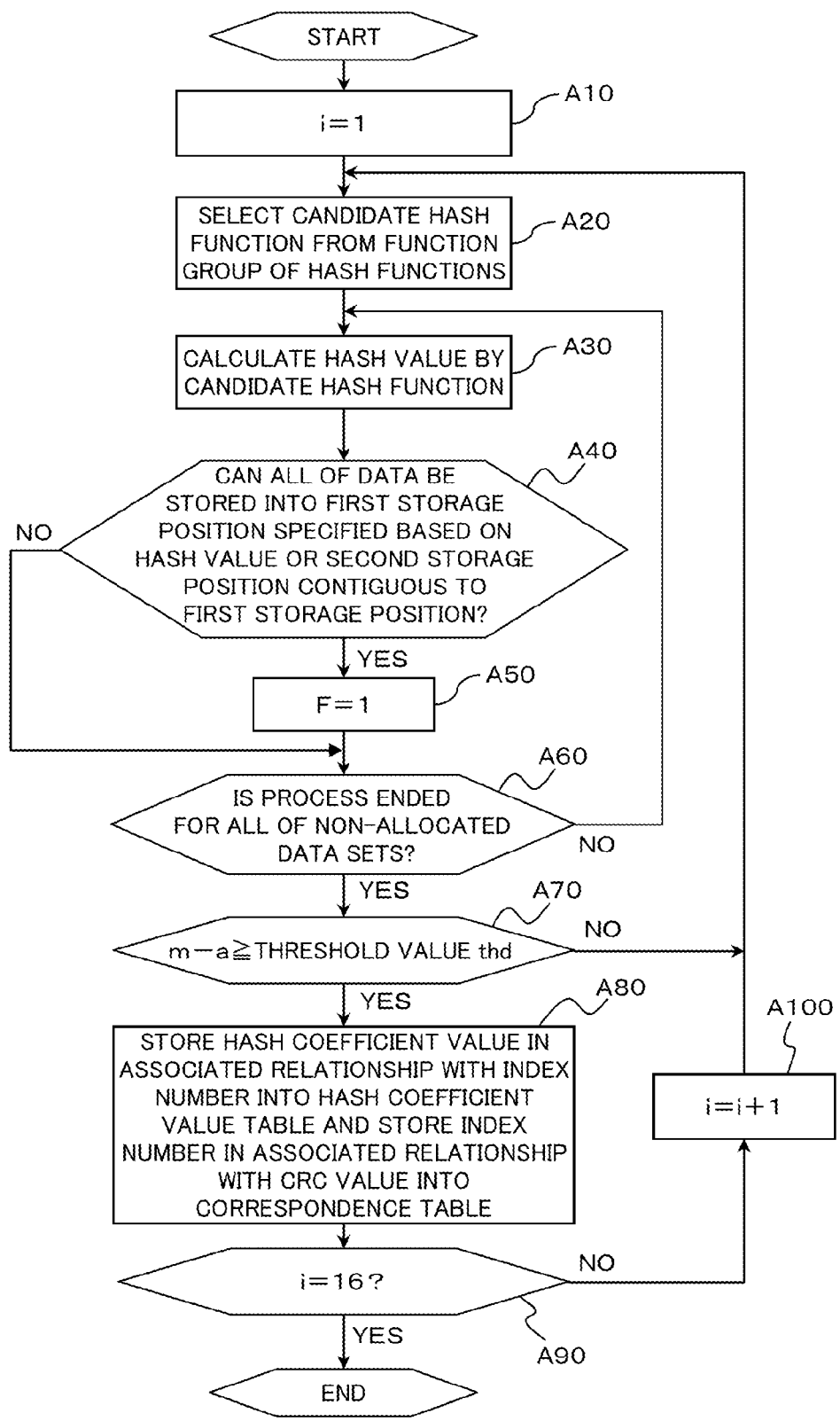

First, as illustrated in FIG. 4, the data storage processing unit 2 causes the hash function determination unit 8 thereof to set "i" to "1" (i=1) (step A10) and select, where a key string $\{x_1, x_2, x_3, \ldots, x_n\}$ of data is represented as $x_K$ ($1 \leq K \leq n$), one hash function specified by a value of a hash coefficient R ($1 \leq R \leq 256$) and included in a function group represented by $f_R(x_K)=f_R(x_{K-1}) \times R + x_K$ [where $f_R(x_0)=R_0$ ($R_0$ is an initial value)] as a candidate hash function (step A20). For example, the value of the hash coefficient R may be set to "1" to select one hash function such that the one hash function is used as the candidate hash function.

Then, the data storage processing unit 2 causes the hash function determination unit 8 thereof to calculate, for each small-scale data set, a hash value based on keys of the plurality of data included in the small-scale data set by the selected candidate hash function (step A30). Here, the data storage processing unit 2 causes the hash function determination unit 8 thereof to calculate, for each small-scale data set, a hash value based on a key of each of a plurality of data included in the small-scale data set by the selected candidate hash function in an ascending order of the identification numbers (data set numbers) of them small-scale data sets.

For example, where a key string $\{x_1, x_2, x_3, \ldots, x_n\}$ of data is represented as $x_K$ ($1 \leq K \leq n$) and one hash function specified by a value of a hash coefficient R ($1 \leq R \leq 256$) and included in a function group represented by $f_R(x_K)=f_R(x_{K-1}) \times R + x_K$ [where $f_R(x_0)=R_0$ ($R_0$ is an initial value)] is selected as a candidate hash function, the expression given above may be deployed to the following product sum expression to calculate a hash value.

$$f_R(\{x_1,x_2,x_3,\ldots,x_n\})=R_0*R^n+x_1*R^{n-1}+x_2*R^{n-2}+x_3*R^{n-3}+\ldots+x_{n-1}*R+x_n$$

By selecting a candidate hash function from a function group in this manner, selection of a candidate hash function is simplified and facilitated, and the speed of selection can be raised. Further, by converting a recursive function into a non-recursive function as described above, it is possible to raise the speed of calculation of a hash value using, for example, a multi-processor parallel process or a CPU instruction prefetch. Further, by using a CPU that includes a calculation function of product sum arithmetic operation or vector arithmetic operation (for example, by using a SIMD instruction of a CPU) and performing calculation of the product sum expression given above by the calculation function of the CPU or by using a CPU that can perform parallel calculation (simultaneous parallel calculation) (for example, a multi-core CPU, namely, a single CPU device having a plurality of CPU units) or by using a plurality of CPUs and performing parallel calculation of the product sum expression given above, calculation of a hash value can be carried out at a high speed. Further, since a hash value is calculated by the single hash function $f_R(x)$, calculation of a hash value can be performed at a high speed in comparison with the above-described CHD algorithm by which a hash value is calculated by a perfect hash function represented by f1 (x)+αf2 (x)+β, namely, calculation of the two hash functions f1 (x) and f2 (x) are required. Consequently, a storage process of data can be carried out at a high speed.

Then, the data storage processing unit 2 causes the hash function determination unit 8 thereof to decide, for each small-scale data set, whether or not all of a plurality of data can be stored into a storage position (first storage position) specified based on a hash value calculated by the selected candidate hash function or another storage position (second storage position) contiguous to the first storage position (step A40). Here, the data storage processing unit 2 causes the hash function determination unit 8 thereof to decide, for each small-scale data set, whether or not all of a plurality of data can be stored into a storage position (first storage position) specified based on the hash value calculated by the selected candidate hash function or another storage position (second storage position) contiguous to the first storage position in an ascending order of the identification number (data set number) of the m small-scale data sets.

Figure 5:
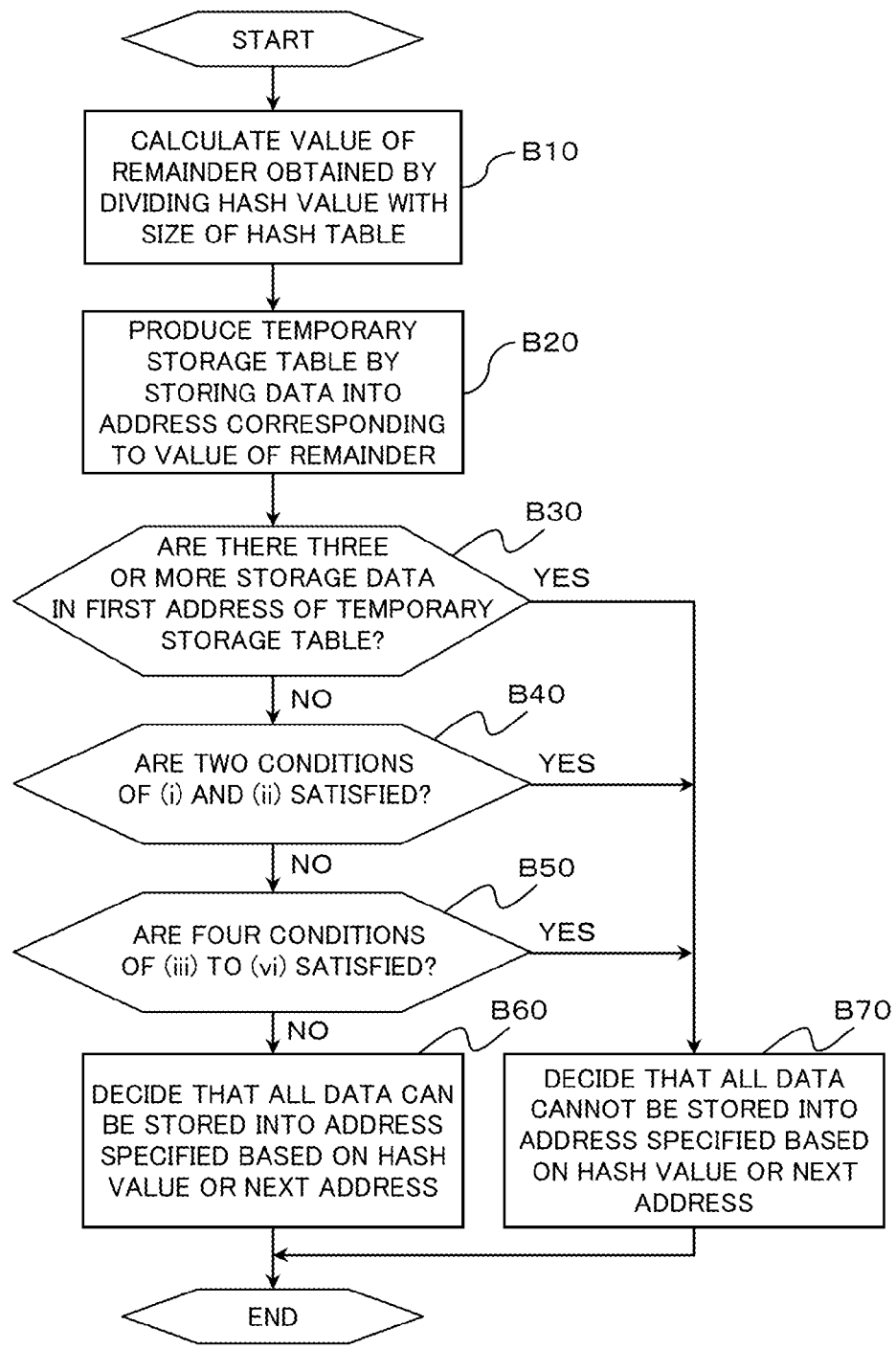

In the following, a case in which it is decided for each small-scale data set whether or not all of a plurality of data can be stored into an address (first storage position) specified based on a hash value calculated by a selected candidate hash function or a next address (second storage position) is taken as an example and described with reference to FIG. 5.

For example, the data storage processing unit 2 causes the hash function determination unit 8 thereof to first calculate a value of the remainder when a hash value calculated based on a key of first data included in the first small-scale data set by the selected candidate hash function is divided by the size of a hash table for the first small-scale data set (step B10) and store the first data into an address (row; storage position) of a temporary storage hash table corresponding to the remainder value (step B20). Here, when the number n' of data included in the first small-scale data set is "4", the size of the hash table for the first small-scale data set may be set to "5" by ROUND (n'÷0.8). It is to be noted that the size "5" of the hash table signifies that the hash table can store five data. Then, a value of the remainder when a hash value calculated based on a key of second data included in the first small-scale data set by the selected candidate hash function is divided by the size of the hash table for the first small-scale data set is calculated (step B10). Then, the second data is stored into an address of the temporary storage table corresponding to the remainder value (step B20). Thereafter, similar processes are performed for all of the plurality of data included in the first small-scale data set. As a result, a temporary storage table for the first small-scale data set is produced.

Then, it is decided whether or not the number of data stored in the first address of the temporary storage table for the first small-scale data set produced in such a manner as described above is three or more (step B30).

If it is decided as a result of the decision that the condition described is not satisfied, then the processing advances to a NO route, in which it is decided (i) whether or not the number of data stored in the following address of the temporary storage table for the first small-scale data set is three or more and (ii) whether or not the number of data stored in the following address is two and besides the number of data stored in the first address is two (step B40).

If it is decided as a result of the decision that none of the two conditions of (i) and (ii) is satisfied, then the processing advances to a NO route. In the NO route, it is successively decided with regard to data stored in each of the following addresses of the temporary storage table for the first small-scale data set (iii) whether the number of data stored in the address is three or more, (iv) whether or not the number of data stored in the address is two and besides the number of data stored in the immediately preceding address is two, (v) whether or not the number of data stored in the address is two and the address is the last address and (vi) whether or not the number of data stored in the address is 1 and the address is the last address and besides the number of data stored in the immediately preceding address is two (step B50).

If it is decided as a result of the decision that the data stored in all of the following addresses of the temporary storage table for the first small-scale data set do not satisfy any of the four conditions of (iii) to (vi), the processing advances to a NO route. In the NO route, it is decided that all of the plurality of data of the first small-scale data set can be stored into the address (first storage position) specified based on the hash value calculated by the selected candidate hash function or the next address (second storage position) (step B60). In this instance, as a result of the decision at step A40 of the flow chart of FIG. 4, the processing advances to a YES route of step A40.

On the other hand, if it is decided that data stored in some address of the temporary storage table for the first small-scale data set satisfies some of the conditions described hereinabove, namely, if it is decided at step B30, B40 or B50 that the condition or conditions are satisfied, then this signifies that all data cannot be stored into the address specified based on the hash value calculated by the selected candidate hash function or the next address. Therefore, it is decided that all of the plurality of data of the first small-scale data set cannot be stored into the address (first storage position) specified based on the hash value calculated by the selected candidate hash function or the next address (second storage position) (step B70). In this instance, as a result of the decision at step A40 of the flow chart of FIG. 4, the processing advances to a NO route of step A40.

It is to be noted that an example in which it is decided whether or not all of a plurality of data can be stored into an address (first storage position) specified based on a hash value calculated by a candidate hash function or a next address (second storage position) is taken as an example and described here, the decision is not limited to this. In particular, it may be decided whether or not all of a plurality of data can be stored into a storage position (first storage position) specified based on a hash value calculated by a candidate hash function or a storage position (second storage position) contiguous to the first storage position. For example, it may be decided whether or not all of a plurality of data can be stored into an address (first storage position) specified based on a hash value calculated by a candidate hash function or a plurality of following addresses (second storage position). Here, the number of address positions following the address as the first storage position to be decided as the second storage position may be determined based on a size of data that can be loaded by execution by one time of a load instruction in a used CPU upon data retrieval processing. For example, in the used CPU, the total size of data and a key of each address is represented by d, and the maximum value of the size of data that can be loaded into a register of the CPU by execution by one time of a load instruction (for example, a general-purpose load instruction to a general-purpose register or a SIMD load instruction corresponding to a SIMD instruction register such as an XMM register or a YMM register) is represented by D. Further, address positions to a yth address following the first storage position are determined as second storage position. In this instance, y may be determined from within a range of $0 \leq y \leq \text{FLOOR}(D \div d)$. Otherwise, it may be decided whether or not all of a plurality of data can be stored into a storage position (first storage position) specified based on a hash value calculated by a candidate hash function or a storage position (second storage position) preceding to the first storage position.

Meanwhile, the decision of whether or not all of a plurality of data of a small-scale data set can be stored into a first storage position specified based on a hash value calculated by a candidate hash function or a second storage position contiguous to the first storage position is a decision of whether or not the candidate hash function is a near-perfect(semi-perfect) hash function for a small-scale data set or a hash table that stores a plurality of data included in a small-scale data set. Here, if a condition that an actual storage position of all of a plurality of data included in a small-scale data set in a hash table is a first storage position specified based on a hash value calculated by a certain hash function or a second storage position contiguous to the first storage position is satisfied, then the hash function is referred to as near-perfect hash function. Further, the probability that a candidate hash function may be selected as a near-perfect hash function by a decision of whether or not it is a near-perfect function for a small-scale data set is higher than the probability that a certain hash function may be selected as a perfect hash function by a decision of whether or not the hash function is a perfect hash function for a small-scale data set as in the CHD algorithm described hereinabove. In other words, by deciding whether or not data can be stored into a first storage position specified based on a hash value calculated by a candidate hash function or a second storage position contiguous to the first storage position to select a hash function, the selection condition of a hash function is moderated from that in an alternative case in which a perfect hash function is selected so that selection of a hash function can be performed readily and at a high speed. Therefore, determination of a hash function for each small-scale data set can be performed at a high speed.

Incidentally, if the data storage processing unit 2 causes the hash function determination unit 8 thereof to decide, at step A40 of FIG. 4, for each small-scale data set, that all of a plurality of data can be stored into a storage position (first storage position) specified based on a hash value calculated by the selected candidate hash function or another storage position (second storage position) contiguous to the first storage position, then the processing advances to a YES route of step A40. In the YES route, a flag F representing that the small-scale data set satisfies the condition, namely, a flag F representing that the candidate hash function is a near-perfect hash function for the small-scale data set, is set to "1" (F=1; step A50), whereafter the processing advances to step A60.

On the other hand, if the data storage processing unit 2 causes the hash function determination unit 8 thereof to decide, at step A40 of FIG. 4, for each small-scale data set, that all of a plurality of data cannot be stored into a storage position (first storage position) specified based on a hash value calculated by the selected candidate hash function or another storage position (second storage position) contiguous to the first storage position, then the processing advances to a NO route of step A40 and advances to step A60 in the NO route. In this case, the flag F has an initially set value "0".

Then at step A60, it is decided whether or not the processes for calculating a hash value by a selected candidate hash function and deciding whether or not all of a plurality of data can be stored into an address (first storage position) specified based on the calculated hash value or another address (second storage position) contiguous to the first storage position have been performed for all of the small-scale data sets to which no hash function is allocated.

At the present stage, no hash function is allocated to any of the small-scale data sets and the processes only for the first small-scale data set have been performed. Therefore, it is decided that the processes have not been performed for all of the small-scale data sets to which no hash function is allocated, and the processing advances to a NO route of step A60. In the NO route, the processing returns to step A30 so that similar processes (steps A30 to A60 and B10 to B70) are repeated for a second or following small-scale data set.

If it is decided at step A60 that the processes have been performed for all small-scale data sets to which no hash function is allocated, then the processing advances to a YES route of step A60. In this instance, a result of the decision of whether or not all of a plurality of data can be stored into an address (first storage position) specified based on a hash value calculated by a selected candidate function or the following address (second storage position) is obtained with regard to all of the small-scale data sets to which no hash function is allocated.

Then, the data storage processing unit 2 causes the hash function determination unit 8 thereof to decide a candidate hash function as a hash function for a small-scale data set with regard to which all of a plurality of data can be stored into a first storage position or a second storage position. Then, the data storage processing unit 2 causes the hash coefficient value table production unit 9 thereof to produce a hash coefficient value table 20 (refer to FIG. 6) that stores values of a plurality of hash coefficients that individually specify a plurality of hash functions. Further, the data storage processing unit 2 causes the correspondence table production unit 10 thereof to produce a correspondence table 21 (refer to FIG. 6) that associates the values of the plurality of coefficients that specify the plurality of hash functions and the plurality of data sets with each other (steps A70 and A80).

For example, if the number of those small-scale data sets with regard to which it is decided that all data can be stored into a first storage position specified based on a hash value calculated by a candidate hash function or a second storage position is a, then when m-a is equal to or smaller than a threshold value thd, the candidate hash function is adopted as a hash function and allocated as a hash function for the a small-scale data sets. In this manner, when the difference between the total number of small-scale data sets and the number of small-scale data sets that satisfy the condition is small, namely, when the number of small-scale data sets that satisfy the condition is great, the candidate hash function is adopted as a hash function. Consequently, one hash function is allocated to a number of small-scale data sets as great as possible.

To this end, it is decided at step A70 whether or not m-a is equal to or lower than the threshold value thd. Then, if it is decided as a result of the decision that m-a is equal to or smaller than the threshold value thd, then the processing advances to a YES route of step A70, in which the processing advances to step A80. At step A80, values of the hash coefficient (here, values $R^1$ to $R^8$) which specify the candidate hash function adopted as the hash function are stored in an associated relationship with the index number 1 into the hash coefficient value table produced in the CPU cache memory 111, namely, into the hash function entity management table 20 (refer to FIG. 6) that associates the index number of the hash function and values (here, the values $R^1$ to $R^8$) of the hash coefficient that specify the hash function with each other (step A80). Further, the index number 1 of the hash function allocated as the hash function to the a small-scale data sets is stored in an associated relationship with CRC values that are identification numbers of the a small-scale data sets into the correspondence table produced in the CPU cache memory 111, namely, into the hash function index table 21 (refer to FIG. 6) that associates the CRC values that are identification numbers of the small-scale data sets and the index number of the hash function with each other (step A80). It is to be noted here that the threshold value thd is, when i satisfies 1≤i≤15, "$2^{17-i}$" and is, when i satisfies i=16, "0". Consequently, the adoption condition of a hash function gradually becomes severe.

Then, it is decided whether or not i is "16", namely, whether or not i=16 is satisfied (step A90), and if a=16 is not satisfied, then i is incremented, namely, i is increased to i=i+1 (step A100), whereafter the processing returns to step A20. At the present stage, since i does not satisfy i=16, it is set to i=2, and then the processing returns to step A20. Where the key string $\{x_1, x_2, x_3, \ldots, x_n\}$ of the data is represented by $x_K$ (1≤K≤n), at step A20, one hash function specified by the value of the hash coefficient R (1≤R≤256) and included in the function group represented by $f_R(x_K)=f_R(x_{K-1})\times R+x_K$ [where $f_R(x_0)=R_0$ ($R_0$ is an initial value) is selected as the candidate hash function. For example, the value of the hash coefficient R may be set to "2" to select one hash function, and the selected hash function may be determined as the candidate hash function. Thereafter, similar processes to those described above are repeated.

On the other hand, if it is decided at step A70 that m-a is higher than the threshold value thd, then the processing advances to a NO route, in which the processing returns to step S20 without adopting the candidate hash function as the hash function of the index number 1. At step A20, i=1 is maintained and, where the key string $\{x_1, x_2, x_3, \ldots, x_n\}$ of the data is represented as $x_K$ ($1 \leq K \leq n$), one hash function specified by the value of the hash coefficient R ($1 \leq R \leq 256$) and included in the function group represented by $f_R(x_K) = f_R(x_{K-1}) \times R + x_K$ [where $f_R(x_0) = R_0$ ($R_0$ is an initial value)] is selected as a candidate hash function. For example, the value of the hash coefficient R may be set to "2" to select one hash function, and the selected hash function may be determined as the candidate hash function. Thereafter, processes similar to those described above are repeated.

Thereafter, if it is decided at step A90 that i=16 is satisfied, then since this signifies that 16 hash functions of the index numbers 1 to 6 have been determined, the processing is ended.

It is to be noted that, where a key string $\{x_1, x_2, x_3, \ldots, x_n\}$ of data is represented as $x_K$ ($1 \leq K \leq n$) and one hash function specified by a value of a hash coefficient R ($1 \leq R \leq 256$) and included in a function group represented by $f_R(x_K) = f_R(x_{K-1}) \times R + x_K$ [where $f_R(x_0) = R_0$ ($R_0$ is an initial value)] is selected as a candidate hash function, the value of the hash coefficient R may be successively increased from "1" or an arbitrary value of 1 to 256 may be successively selected as the value of the hash coefficient R. However, in order to prevent a hash function that has been selected as the candidate hash function and subjected to the processes described above from being selected again, preferably the hash function is labeled as "used" after the processes described above are performed (for example, in the NO route of step A70 or step A90). This makes it possible to select a non-used hash function when a candidate hash function is selected at step A20. Further, where hash functions are successively determined from the index number 1 to the index number 16 as described above, in the process for determining the hash function of the index number 1, it is necessary to perform such processes as the process for calculating a hash value for all small-scale data sets. However, in the process for determining hash functions of the index number 2 and the following index numbers, the processes such as the process for calculating a hash value may be performed for those small-scale data sets to which no hash function is allocated. Further, as described above, in the case of i=16, the threshold value thd is set to "0" such that, when all of those small-scale data sets to which no hash function is allocated as yet satisfy the condition at step A40 described above, a hash function of the index number 16 is determined so that there remain no small-scale data set to which no hash function is allocated. However, the determination of a hash function is not limited to this, but any measures may be taken to prevent a small-scale data set, to which no hash function is allocated, from remaining. For example, the following measures may be taken. In particular, the threshold value thd is fixed without being varied, and the decision (step A90) regarding whether or not i=16 is satisfied is performed prior to step A80. Then, if it is decided at step A90 that i=16 is not satisfied, then the processing advances to step A100, but if it is decided that i=16 is satisfied, it is decided further whether or not there remains a small-scale data set to which no hash function is allocated. Then, if it is decided that there remains no small-scale data set to which no hash function is allocated, then the processing advances to A80, but if it is decided that there remains a small-scale data set to which no hash function is allocated, then the processing returns to step A20. Then, similar processes are repeated until it is decided that there remains no small-scale data set to which no hash function is allocated.

In this manner, the data storage processing unit 2 causes the hash function determination unit 8 thereof to determine 16 hash functions to be used, namely, 16 hash functions of the index numbers 1 to 16 to be allocated to a plurality of small-scale data sets. A hash function pool is configured from the 16 hash functions determined in this manner. Then, from the hash function pool configured from the 16 hash functions, a hash function for each small-scale data set is allocated. To this end, the data storage processing unit 2 causes the hash function determination unit 8 thereof to determine a hash function pool configured from 16 hash functions. Further, the data storage processing unit 2 causes the hash coefficient value table production unit 9 thereof to associate the values of the hash coefficients for specifying the 16 hash functions (here the values of $R^1$ to $R^8$; each of the values is configured from 2 bytes) with the index numbers 1 to 16 thereby to produce a hash coefficient value table 20 (refer to FIG. 6) in the CPU cache memory 111. It is to be noted that the hash coefficient value table 20 is referred to also as hash coefficient set. Further, the data storage processing unit 2 causes the correspondence table production unit 10 thereof to associate the index numbers of the allocated hash functions from among the index numbers 1 to 16 of the 16 hash functions with the CRC values that are identification numbers individually of the plurality of small-scale data sets thereby to produce a correspondence table 21 (refer to FIG. 6) in the CPU cache memory 111. Since only it is necessary to produce a correspondence table 21 and a hash coefficient value table 20 (refer to FIG. 6) in this manner, the data storage process can be performed at a high speed in comparison with that in an alternative case of the above-described CHD algorithm which involves a compression process of operators.

Here, since the number of hash functions allocated to a plurality of small-scale data sets is 16, an index number of a hash function associated with a CRC value of each small-scale data set, namely, an identifier for identifying each of the 16 hash functions, can be represented by 4 bits (fixed length). In other words, in the case of m small-scale data sets, a correspondence table can be produced by using a matrix of m rows and 1 column and storing one of the index numbers of the 16 hash functions represented by 4 bits into each row. Here, although the number of small-scale data sets depends upon the number of data to be stored, for example, if average four data are included in one small-scale data set, then the number of small-scale data sets becomes to one fourth of the total number of data. Further, since the information amount necessary to associate a hash function with each small-scale data set is four bits, the information amount necessary per one data is approximately 1 bit. Further, if 16 hash functions are used, if eight values of, for example, $R^1$ to $R^8$ are stored as values of hash coefficients for each of the 16 hash functions into the hash value coefficient table and the size of each of the eight values is 2 bytes, then the size of the hash value coefficient table is 256 bytes. Accordingly, when the number of data to be stored is n, the information amount per one data necessary to associate a hash function with each small-scale data set is approximately (n+2048) bits. For example, the information amount per one data is, where n is 1,000,000, 1.002 n bits, where n is 100,000, 1.020 n bits, and where n is 10,000, 1.205 n bits (storage efficiency is approximately 80%). In this manner, the information amount per one data can be reduced in comparison with that of the CHD algorithm in which the information amount per one data is 1.62 n bits (storage efficiency 81%) or 2.3 n bits (storage efficiency 100%). Specifically, as the scale of a data set increases, the information amount per one data can be reduced. Therefore, when a large-scale data set is divided into and stored as small-scale data sets, the amount of information necessary to associate a hash function with each small-scale data set can be reduced. Consequently, it is possible to retain the information with certainty in the CPU cache memory 111, and as a result, a high speed data retrieval can be implemented. In short, by reducing the identifier length of hash functions for all small-scale data sets to reduce the memory usage, it is possible to improve the cache hit ratio and implement a higher speed data retrieval.

It is to be noted that, although, for example, eight values of $R^1$ to $R^8$ are stored as values of the hash coefficient for each of 16 hash functions to produce a hash coefficient value table, the production of a hash coefficient value table is not limited to this. In particular, one value or a plurality of values may be stored as a value or values of a hash coefficient for each of the 16 hash functions to produce a hash coefficient value table. For example, one value of $R^1$ may be stored as a value of a hash coefficient for each of 16 hash functions to produce a hash coefficient value table. Or, S (S≥2) values of $R^1$ to $R^S$ may be stored as values of a hash coefficient for each of 16 hash functions to produce a hash coefficient value table. Where a key string $\{x_1, x_2, x_3, \ldots, x_n\}$ of data is represented as $x_K$ (1≤K≤n) and one hash function specified by a value of a hash coefficient R (1≤R≤256) and included in a function group represented by $f_R(x_K)=f_R(x_{K-1}) \times R+x_K$ [where $f_R(x_0)=R_0$ ($R_0$ is an initial value)] is used to calculate a hash value, n values of $R^1$ to $R^n$ are required as values of a hash coefficient as can be recognized from the product sum expression given hereinabove. Therefore, if one value or a plurality of values smaller than n are stored as values of a hash coefficient for each of 16 hash functions to produce a hash coefficient value table, then when a hash value is calculated, a value of a hash coefficient that is stored in the hash coefficient value table may be used to calculate a value of a hash coefficient that is not stored in the hash coefficient value table. For example, if only the value of $R^1$ is stored as a value of a hash coefficient to produce a hash coefficient value table, then when a hash value is calculated, the values of $R^2$ to $R^n$ may be calculated using the value of $R^1$. Further, if a CPU having a calculation function of product sum arithmetic or vector arithmetic is used (for example, a SIMD instruction of a CPU is used) to perform calculation of the product sum expression described hereinabove by the calculation function or a CPU that can perform parallel calculation (simultaneous parallel calculation) (for example, a multi-core CPU, namely, a single CPU device having a plurality of CPU units) or a plurality of CPUs are used to carry out parallel calculation of the product sum expression given hereinabove thereby to calculate a hash value, the number of values of a hash coefficient to be stored in a hash coefficient value table may be determined using the CPU or CPUs to be used. For example, when the product sum expression given hereinabove is divided into Z terms (partial expressions consisting of multiplication) and the Z terms are successively calculated, for example, using a SIMD instruction of a CPU to calculate hash values, the Z values of $R^1$ to $R^Z$ may be stored as values of a hash coefficient for each of 16 hash functions to produce a hash coefficient value table. For example, when the product sum expression given hereinabove is divided into eight terms and the eight terms are successively calculated using, for example, a SIMD instruction of a CPU to calculate hash values, the eight values of $R^1$ to $R^8$ may be stored as values of a hash coefficient for each of the 16 hash functions to produce a hash coefficient value table. In this instance, where the key string of data is $\{x_1, x_2, x_3, \ldots, x_n\}$ (n≤8), when a hash value is calculated, it is possible to successively calculate the eight terms including $R^1$ to $R^8$ using, for example, a SIMD instruction of a CPU by using the eight values of $R^1$ to $R^8$ stored in the hash coefficient value table thereby to calculate hash values at a high speed. Further, where the key string of data is $\{x_1, x_2, x_3, \ldots, x_n\}$ (n>8), when a hash value is calculated, it is possible to arbitrarily use the eight values of $R^1$ to $R^8$ stored in the hash coefficient value table to calculate the value of $R^n$ (n≥9) and successively calculate the n terms including $R^1$ to $R^n$ using, for example, a SIMD instruction of a CPU for every eight terms to calculate hash values at a high speed. Further, for example, when the product sum expression given hereinabove is divided into Z terms (partial expressions consisting of multiplication) and the Z terms are successively calculated in parallel using a CPU that can perform parallel calculation or a plurality of CPUs to calculate hash values, the Z values of $R^1$ to $R^Z$ may be stored as values of a hash coefficient for each of the 16 hash functions to produce a hash coefficient value table. For example, when the product sum expression given hereinabove is divided into eight terms and the eight terms are calculated in parallel using a CPU that can perform parallel calculation or a plurality of CPUs to calculate hash values, the eight values of $R^1$ to $R^8$ may be stored as values of a hash coefficient for each of the 16 hash functions to produce a hash coefficient value table. In this instance, where a key string of data is $\{x_1, x_2, x_3, \ldots, x_n\}$ (n<8), when a hash value is selected, it is possible to calculate in parallel the eight terms including $R^1$ to $R^8$ using the eight values of $R^1$ to $R^8$ stored in the hash coefficient value table thereby to calculate hash values at a high speed. Further, where a key string of data is $\{x_1, x_2, x_3, \ldots, x_n\}$ (n>8), when a hash value is calculated, if the eight values of $R^1$ to $R^8$ stored in the hash coefficient value table are arbitrarily used to calculate the value of $R^n$ (n≥9) and calculate the n terms including $R^1$ to $R^n$ in parallel for every eight terms, then hash values can be calculated at a high speed. Also it is possible to calculate hash values at a high speed, for example, by combining the method that uses a SIMD instruction of a CPU and the method that involves parallel calculation. It is to be noted that preferably the size of a hash coefficient value table is determined in response to the size of the CPU cache memory so that the hash coefficient value table may be retained in the CPU cash memory. In short, it is preferable to determine the number of values of a hash coefficient to be stored in a hash coefficient value table in response to the size of the CPU cache memory so that the hash coefficient value table may be retained in the CPU cache memory.

Further, although a cased in which the process for determining a plurality of hash functions (step S20 of FIG. 3), the process for producing a hash coefficient value table (step S30 of FIG. 3) and the process for producing a correspondence table (step S40 of FIG. 3) are performed in parallel is taken as an example and described, execution of the processes is not limited to this. For example, the process for producing a hash coefficient value table and the process for producing a correspondence table may be performed after the process for determining a plurality of hash functions is performed.

Then, the data storage processing unit 2 causes the hash table production unit (hash information production unit) 11 thereof to produce a plurality of hash tables 22 individually for the plurality of data sets (step S50). Particularly, the data storage processing unit 2 causes the hash table production unit 11 thereof to produce, for each data set, a hash table 22 for the data set by storing data and a key into a first storage position specified based on a hash value calculated by a hash function for the data set using keys of a plurality of data or a second storage position. Consequently, a plurality of hash tables 22 are retained in the main memory 101 and a hash table storage unit (hash information storage unit) 6 that stores the plurality of hash tables 22 is produced in the main memory 101.

Figure 7:
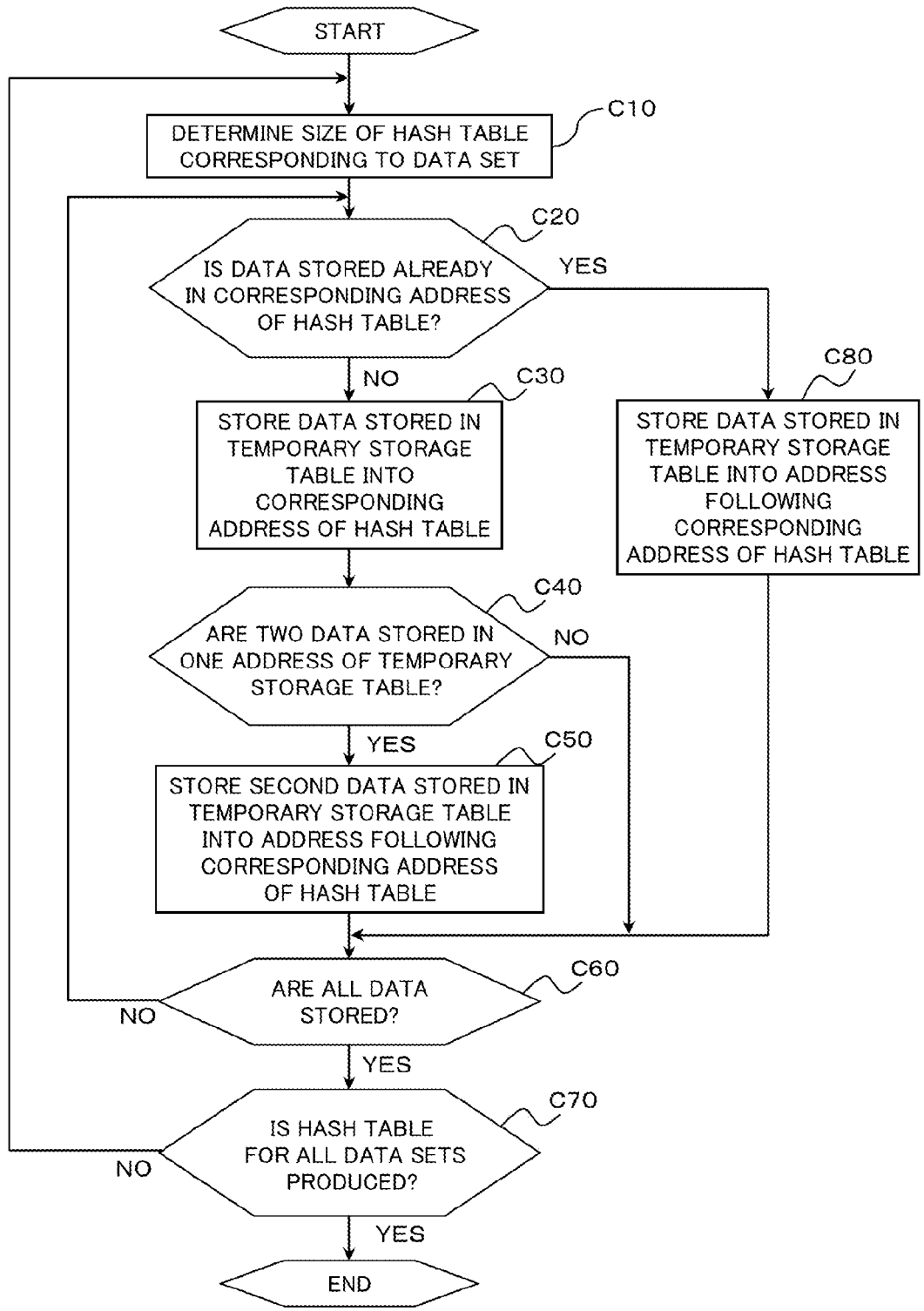
FIGS. 7 to 9 are flow charts illustrating processes (data storage method) by the data storage processing unit (data storage program) provided in the data retrieval apparatus according to the present embodiment.

Here, the data storage processing unit 2 causes the hash table production unit 11 thereof to first determine a size of a hash table 22 for a small-scale data set as illustrated in FIG. 7 (step C10). For example, when the number n' of data included in the small-scale data set is "4", the size of the hash table 22 for the small-scale data set may be set, for example, to "5" by ROUND(n'÷0.8). Thus, by determining a size of the hash table 22 based on the size of the small-scale data set, the data storage ratio of the hash table 22 for the small-scale data set can be set to approximately 80%.

Then, the data storage processing unit 2 causes the hash table production unit 11 thereof to produce hash tables 22 for the small-scale data sets and store the hash tables 22 into the main memory 101 (steps C20 to C80). In particular, as the hash tables 22 for the small-scale data sets, hash tables 22 of a size determined in such a manner as described above are produced in the main memory 101, and the data and the keys are stored into the first storage positions specified based on hash values calculated by hash functions allocated to the small-scale data sets or the second storage positions using the keys of the data included in the small-scale data sets thereby to produce hash tables 22 for the small-scale data sets.

The hash tables 22 for the small-scale data sets may be produced, for example, using temporary storage tables for the small-scale data sets produced by the process by the hash function determination unit 8 of the data storage processing unit 2 described hereinabove. It is to be noted here that, for each of the small-scale data sets, all of a plurality of data are stored into an address (first storage position) specified based on a hash value calculated by a hash function allocated to the small-scale data set or a next address (second storage position) to produce a hash table 22. Further, an example wherein 16 hash tables 22 are successively produced from the first hash table 22 for the first small-scale data set to the 16th hash table 22 for the 16th small-scale data set is taken as an example here and described.

In particular, as illustrated in FIG. 7, the data storage processing unit 2 first causes the hash table production unit 11 thereof to decide whether or not data is stored already in an address of the hash table 22 corresponding to an address of the temporary storage table (step C20). If no data is stored as yet, then the processing advances to a NO route of step C20, in which the data stored in the temporary storage table are stored into the corresponding address of the hash table (step C30). However, if data is store already at step C20, then the processing advances to a YES route, in which the data stored in the temporary storage table is stored into an address next to the corresponding address of the hash table (step C80).

This stage is a stage at which the first data stored in the first address (row) of the temporary storage table for the first small-scale data set is stored into the first address (row) of the first hash table 22 for the first small-scale data set in the main memory 101. Therefore, no data is stored as yet, and consequently, the processing advances to a NO route of step C80. In the NO route, the first data stored in the first address of the temporary storage table for the first small-scale data set is stored into the first address of the first hash table 22 for the first small-scale data set in the main memory 101 (step S30).

Then, the data storage processing unit 2 causes the hash table production unit 11 thereof to decide whether or not two data are stored in one address of the temporary storage table (step C40). If two data are stored in one address of the temporary storage table, then the processing advances to a YES route of step C40, in which the second data is stored into an address next to the corresponding address of the hash table 22 (step C50). However, if two data are not stored in one address of the temporary storage table, then the processing advances to a NO route of step C40, in which it advances to step S60.

At this stage, it is decided whether or not two data are stored in the first address of the temporary storage table for the first small-scale data set (step C40), and if two data are stored in the first address of the temporary storage table for the first small-scale data set, then the processing advances to the YES route of step C40. In the YES route, the second data is stored into the second address of the first hash table 22 for the first small-scale data set in the main memory 101 (step C50). On the other hand, if two data are not stored in the first address of the temporary storage table for the first small-scale data set, then the processing advances to the NO route of step C40, in which it advances to step C60.

Thereafter, the data storage processing unit 2 causes the hash table production unit 11 thereof to decide whether or not all data stored in the temporary storage table have been stored into the hash tables 22 in the main memory 101 (step C60). If it is decided that all data have not been stored, then the processing advances to a NO route of step C60, in which it returns to step C20 to repeat similar processes.

At this stage, since all data have not been stored, the processing returns to step C20. This stage is a stage at which the first data stored in the second address of the temporary storage table for the first small-scale data set is stored into the second address of the first hash table 22 for the first small-scale data set in the main memory 101. Therefore, at step C20, it is decided whether or not data is stored already in the second address of the first hash table 22 for the first small-scale data set in the main memory 101 (step C20).

If it is decided as a result of the decision at step C20 that no data is stored as yet, then the processing advances to the NO route, in which the first data stored in the second address of the temporary storage table for the first small-scale data set is stored into the second address of the first hash table 22 for the first small-scale data set in the main memory 101 (step C30). Then, it is decided whether or not two data are stored in the second address of the temporary storage table for the first small-scale data set (step C40). If two data are stored in the second address of the temporary storage table for the first small-scale data set, then the processing advances to a YES route of step S40, in which the second data is stored into the third address of the first hash table 22 for the first small-scale data set in the main memory 101 (step C50). On the other hand, if two data are not stored in the second address of the temporary storage table for the first small-scale data set at step C40, then the processing advances to a NO route, in which it advances to step C60.

On the other hand, if it is decided at step C20 that data is stored already, then the processing advances to the YES route, in which the first data stored in the second address of the temporary storage table for the first small-scale data set is stored into the third address of the first hash table 22 for the first small-scale data set in the main memory 101 (step C80).

Thereafter, similar processes are repeated to successively store data stored in the addresses following the third address of the temporary storage table for the first small-scale data set into corresponding addresses of the first hash table 22 for the first small-scale data set in the main memory 101 or the addresses following the corresponding addresses.

Then, if it is decided at step C60 that all data have been stored, then the processing advances to a YES route, in which it is decided whether or not a hash table 22 has been produced for all small-scale data sets (step C70). If it is decided as a result of the decision that a hash table 22 has been produced for all small-scale data sets, then the processing is ended, but if it is decided that a hash table 22 has not been produced for all small-scale data sets, then the processing advances to the NO route, in which it returns to step C10 to repeat similar processes.

This stage is a stage at which, as the first hash table 22 for the first small-scale data set, a hash table 22 in which all of a plurality of data are stored in an address or addresses (first storage position) specified based on a hash value calculated by a hash function allocated to the first small-scale data set or a next address or addresses (second storage position) is produced in the main memory 101. Therefore, at step C70, it is decided that a hash table 22 has not been produced for all small-scale data sets, and the processing advances to the NO route, in which it returns to step C10. Then, similar processes are repeated to produce second and following hash tables 22 for the second and following small-scale data sets in the main memory 101.

Then, if it is decided at step C70 that a hash table 22 has been produced for all small-scale data sets, then the processing is ended.

Consequently, as a hash table 22 for each of the small-scale data sets, a hash table 22 in which all of a plurality of data are stored in an address (first storage position) specified based on a hash value calculated by a hash function allocated to the small-scale data set or a next address (second storage position) can be produced in the main memory 101. The hash table 22 produced based on such a near-perfect hash function guarantees that data is stored in an address (first storage position) specified based on a hash value or a next address (second storage position). Therefore, as hereinafter described, upon data retrieval, since only it is necessary to read out the data stored in the addresses at a time and decide whether or not in which one of the addresses the data is stored, degradation of the data retrieval efficiency can be suppressed in comparison with that in an alternative case in which a perfect hash function is used. In other words, by moderating the selection conditions for a hash function from those in the alternative case in which a perfect hash function is selected as described above, while selection of a hash function can be performed readily and at a high speed, degradation of the data retrieval efficiency can be suppressed from that in an alternative case in which a perfect hash function is used.

Figure 8:
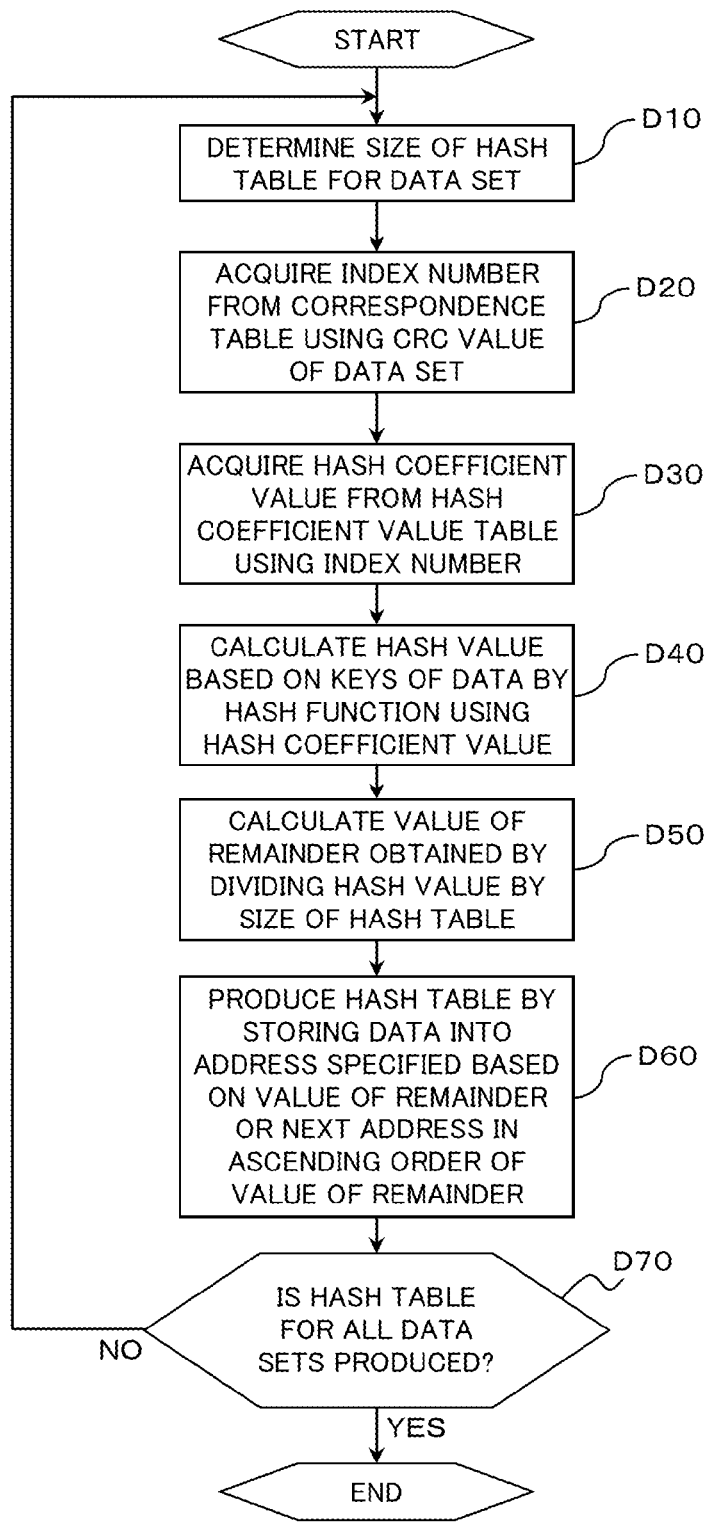

It is to be noted that, although a temporary storage table for each small-scale data set produced by the processes of the hash function determination unit 8 of the data storage processing unit 2 described hereinabove is used here to produce a hash table 22 for the small-scale data set, production of the hash tables 22 is not limited to this. For example, the hash tables 22 may be produced in such a manner as illustrated in FIG. 8. Referring to FIG. 8, the data storage processing unit 2 causes the hash table production unit 11 thereof to determine a size of a hash table 22 for a small-scale data set (step D10) and acquire an index number from a correspondence table 21 (refer to FIG. 6) using a CRC value that is an identification number of the small-scale data set (step D20). Then, the acquired index number is used to acquire a value of a hash coefficient that specifies a hash function allocated to the small-scale data set from a hash coefficient value table 20 (refer to FIG. 6) using the acquired index number (step D30). Then, the acquired value of the hash coefficient is used to calculate a hash value based on a key of each data included in the small-scale data set by the hash function allocated to the small-scale data set (step D40). Then, a value of the remainder when the calculated hash value is divided by the size of the hash table 22 for the small-scale data set is calculated (step D50). Then, the data and the keys are stored into an address (first storage position) specified based on a hash value of the hash table 22 for the small-scale data set in the main memory 101 (here, based on the value of the remainder calculated based on the hash value) or a next address (second storage position) in an ascending order of the remainder value similarly as described hereinabove to produce a hash table for each small-scale data set (step D60). Then, similar processes may be repeated until it is decided at step D70 that a hash table 22 has been produced for all small-scale data sets. It is to be noted that, although a size of the hash tables 22 is determined first here, determination of the size is not limited to this. In particular, this process (step D10) may be performed at least before a process for storing data into the hash table 22 is performed (step D60).

It is to be noted here that, although an example wherein all of a plurality of data are stored into an address (first storage position) specified based on a hash value calculated by a hash function allocated to a small-scale data set or a next address (second storage position) to produce a hash table 22 is taken as an example and described, production of a hash table 22 is not limited to this. In particular, all of a plurality of data may be stored into a storage position (first storage position) specified based on a hash value calculated by a hash function allocated to a small-scale data set or another storage position (second storage position) following the first storage position to produce a hash table. For example, all of a plurality of data may be stored into an address (first storage position) specified based on a hash value calculated by a hash function allocated to a small-scale data set or a plurality of addresses (second storage position) following the first storage position to produce a hash table. Here, a number of addresses to be used as the second storage position following the address of the first storage position may be determined in response to a size of data that can be loaded by one time execution of a load instruction by a CPU to be used upon data retrieval processing. For example, in the used CPU, the total size of data and a key of each address is represented by d, and the maximum value of the size of data that can be loaded into a register of the CPU by execution by one time of a load instruction (for example, a general-purpose load instruction to a general-purpose register or a SIMD load instruction corresponding to a SIMD instruction register such as an XMM register or a YMM register) is represented by D. Further, address positions to a yth address following the first storage position are determined as second storage position. In this instance, y may be determined from within a range of $0 \leq y \leq FLOOR(D \div d)$. Here, if a high value is selected as the value of y, then since the probability that a certain hash function may be a near-perfect hash function rises, the process for determining a hash function is facilitated and besides the number of hash functions to be used upon storage of a large amount of data can be reduced further. It is to be noted that, if a high value is selected as the value of y, then the period of time (CPU time) required upon data retrieval until retrieval target data is retrieved or it is decided that retrieval target data is not stored increases by approximately several nanoseconds to several tens nanoseconds. For example, the CPU time required for such a decision is approximately 2/2 clocks in average. Therefore, even if the time required for the decision described above becomes longer by selection of a high value as the value of y, the influence of this upon the retrieval processing capacity is as little as can be ignored. Or else, for example, all of a plurality of data may be stored into a storage position (first storage position) specified based on a hash value calculated by a hash function allocated to a small-scale data set or another storage position (second storage position) preceding to the first storage position to produce a hash table 22.

Now, processes by the data retrieval processing unit 3 provided in the data retrieval apparatus 1, namely, processes (data retrieval method) executed in accordance with a data retrieval program read into the main memory 101 by the CPU 102 in the data retrieval apparatus 1, are described with reference to FIG. 9.

Here, if the data retrieval processing unit 3 receives a retrieval request for data, then it performs data retrieval for a plurality of hash tables 22 in the main memory 101 in the following procedure.

Figure 9:
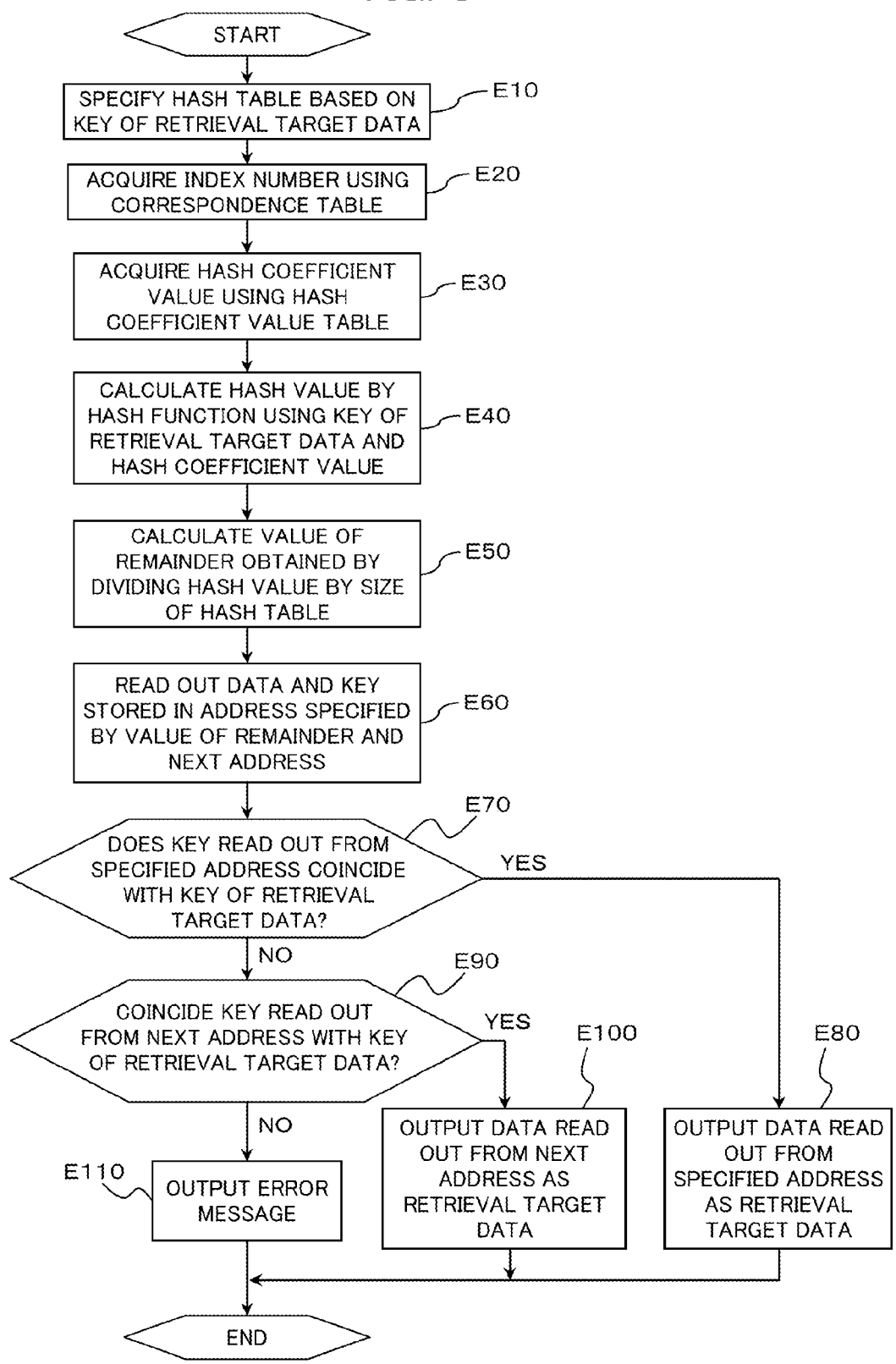

First, as depicted in FIG. 9, the data retrieval processing unit 3 causes the hash table specification unit (hash information specification unit) 12 thereof to specify, from among a plurality of hash tables 22 that individually store a plurality of data sets obtained by dividing a data set, one hash table 22 that stores one data set including retrieval target data based on a key of the retrieval target data (step E10).

Here, after the data retrieval processing unit 3 receives a key of the retrieval target data, it causes the hash table specification unit 12 thereof to calculate a CRC32 value of the key of the retrieval target data and calculate a value (CRC value) of the remainder when the calculated CRC32 value is divided by the number m of the small-scale data sets. The CRC value calculated based on the key of the retrieval target data in this manner can be used as an identification number of the m small-scale data sets obtained by dividing the large-scale data including n data, namely as an identification number of m hash tables that individually store the m small-scale data sets. Therefore, based on the CRC value calculated based on the key of the retrieval target data in such a manner as described above, a hash table that stores a data set including the retrieval target data can be specified from among the m hash tables. In other words, an identification number (identifier) of a hash table that stores the data set including the retrieval target data can be acquired based on the key of the retrieval target data. For example, where a CPU that supports a SSE4.2 extended instruction set is used, a CRC32c operation instruction (built-in function name: crc32) built in as hardware can be used to specify a hash table that stores the data set including the retrieval target data at a high speed.

Then, the data retrieval processing unit 3 causes the hash coefficient value acquisition unit 13 thereof to acquire, based on the key of the retrieval target data, a value of one hash coefficient that specifies one hash function corresponding to one data set using a correspondence table 21 (refer to FIG. 6) that associates a plurality of data sets and values of a hash coefficient that individually specify a plurality of hash functions with each other and a hash coefficient value table 20 (refer to FIG. 6) that stores values of a plurality of hash coefficients that individually specify a plurality of hash functions (steps E20 and E30).

Here, the data retrieval processing unit 3 causes the hash coefficient value acquisition unit 13 thereof to use the CRC value calculated based on the key of the retrieval target value in such a manner as described above and use the correspondence table 21 (refer to FIG. 6) in the CPU cache memory 111 to acquire an index number (step E20). Then, this index number is used to acquire a value (here, the values $R^1$ to $R^8$) of a hash coefficient that specifies a hash function corresponding to the data set including the retrieval target data (step E30). In this manner, a value of a hash coefficient that specifies a hash function (near-perfect hash function) allocated to the hash table 22 that stores the data set including the retrieval target data is acquired from the CPU cache memory 111.

Since both of the correspondence table 21 and the hash coefficient value table 20 (refer to FIG. 6) are stored in the CPU cache memory 111 in this manner, access to the value of the hash coefficient that specifies the hash function corresponding to the data set including the retrieval target data can be increased in speed. Further, since the index number is configured from a fixed length of 4 bits (4-bit fixed length entry), a physical position in which a value of a desired hash coefficient is stored can be accessed by the four arithmetic operations of the top address+index number×4 bits, and therefore, increase in speed in access can be anticipated. Consequently, specification of a data position in the hash table 22 that stores the data set including the retrieval target data can be performed at a high speed.

Thereafter, the data retrieval processing unit 3 causes the hash value calculation unit 14 thereof to calculate a hash value by one hash function using the key of the retrieval target data and a value of one hash coefficient (step E40).

Here, the data retrieval processing unit 3 causes the hash value calculation unit 14 thereof to calculate a hash value by one hash function specified, where a key string $\{x_1, x_2, x_3, \ldots, x_n\}$ of data is represented as $x_K$ ($1 \leq K \leq n$), by a value of a hash coefficient R ($1 \leq R \leq 256$) and included in a function group represented by $f_R(x_K) = f_R(x_{K-1}) \times R + x_K$ [where $f_R(x_0) = R_0$ ($R_0$ is an initial value)] using the key of the retrieval target data and a value (here, each value of $R^1$ to $R^8$), acquired in such a manner as described above, of the hash coefficient that specifies the hash function corresponding to the data set including the retrieval target data (step E40). Then, a value of the remainder when the calculated hash value is divided by the size (here, 5) of the hash table for the data set including the retrieval target data is calculated (step E50). It is to be noted that the calculation of the hash value may be performed similarly to the calculation of a hash value by the hash function determination unit 8 of the data storage processing unit 2. Since a hash value is calculated by the single hash function $f_R(x)$ in this manner, calculation of a hash value can be performed at a high speed in comparison with that by the CHD algorithm described hereinabove, which involves calculation of a hash value by a perfect hash function represented by $f1(x) + \alpha f2(x) + \beta$, namely, which requires calculation of the two hash functions $f1(x)$ and $f2(x)$.

Thereafter, the data retrieval processing unit 3 causes the readout unit 15 thereof to read out data and keys stored in a first storage position specified based on the hash value and a second storage position contiguous to the first storage position from one hash table 22 (step E60). Since data and keys stored in the first storage position specified based on the hash value and the second storage position contiguous to the first storage position are read out in this manner, degradation of the data retrieval efficiency can be suppressed in comparison with that in the alternative case in which a perfect hash function is used.

Here, the data retrieval processing unit 3 causes the readout unit 15 thereof to read out data and keys stored in an address (first storage position) specified by a value of the remainder when the hash value calculated in such a manner as described above is divided by the size of the hash table and a next address (second storage position) from the main memory 101 (or the CPU cache memory 111), particularly, from the hash table 22 specified by the CRC value calculated based on the key of the retrieval target data in such a manner as described above (step E60).

It is to be noted that, since here a hash table 22 with regard to which all of a plurality of data are stored in an address (first storage position) specified based on a hash value or a next address (second storage position) is produced in the main memory 101 as described above, a case in which data and keys stored in the address (first storage position) specified based on the hash value or the next address (second storage position) are read out is taken as an example and described, the readout of data and a key is not limited to this. In particular, data and keys stored in a storage position (first storage position) specified based on a hash value or another storage position (second storage position) contiguous to the first storage position may be read out in response to the hash table 22 produced by the hash table production unit 11 of the data storage processing unit 2 described hereinabove. For example, where all of a plurality of data are stored in an address (first storage position) specified based on a hash value calculated by a hash function allocated to a small-scale data set or a plurality of addresses (second storage position) following the first storage position to produce a hash table 22, the data and the key stored in the address (first storage position) specified based on a hash value or in the plurality of addresses (second storage position) following the first storage position may be read out. Here, a number of addresses to be used as the second storage position following the address of the first storage position may be determined in response to a size of data that can be loaded by one time execution of a load instruction by a CPU to be used. For example, in the used CPU, the total size of data and a key of each address is represented by d, and the maximum value of the size of data that can be loaded into a register of the CPU by execution by one time of a load instruction (for example, a general-purpose load instruction to a general-purpose register or a SIMD load instruction corresponding to a SIMD instruction register such as an XMM register or a YMM register) is represented by D. Further, address positions to a yth address following the first storage position are determined as second storage position. In this instance, y may be determined from within a range of $0 \leq y \leq FLOOR(D \div d)$. In addition, for example, where all of a plurality of data are stored in a storage position (first storage position) specified based on a hash value calculated by a hash function allocated to a small-scale data set or another storage position (second storage position) preceding to the first storage position to produce a hash table 22, the data and the key stored in the storage position (first storage position) specified based on a hash value or in the storage position (second storage position) preceding to the first storage position may be read out.

Thereafter, the data retrieval processing unit 3 causes the outputting unit 16 thereof to output, when it is decided that a key read out from the first storage position or the second storage position coincides with the key of the retrieval target data, data associated with the key decided to be coincident as the retrieval target data (steps E70 to E110).

Here, the data retrieval processing unit 3 causes the outputting unit 16 thereof to decide whether or not the keys readout from the address (first storage position) specified based on a hashed value in such a manner as described above and the next address (second storage position) coincide with the key of the retrieval target data. In particular, it is decided first whether or not the key read out from the address specified based on the hash value coincides with the key of the retrieval target data (step E70) and then decided whether or not the key read out from the address next to the address specified based on the hash value coincides with the key of the retrieval target data (step E90). If it is decided as a result of the decisions that the key read out from the address specified based on the hash value coincides with the key of the retrieval target data, then the data associated with the key read out from the address specified based on the hash value is outputted as the retrieval target data (step E80). On the other hand, if it is decided that the key read out from the address next to the address specified based on the hash value coincides with the key of the retrieval target data, then the data associated with the key read out from the address next to the address specified based on the hash value is outputted as the retrieval target data (step E100). Further, if any of the key read out from the address specified based on the hash value and the key read out from the address next to the address specified based on the hash value does not coincide with the key of the retrieval target data, then a retrieval failure message (error message) is output (step E110).

Accordingly, the data retrieval apparatus, data storage method and data retrieval method according to the present embodiment are advantageous in that the data storage speed and the data retrieval speed can be improved while degradation of the data retrieval efficiency is suppressed as far as possible.

Specifically, with the data retrieval apparatus, data storage method and data retrieval method according to the present embodiment, a small number of hash functions are re-utilized using a near-perfect hash function and the correspondence table 21 and the hash coefficient value table 20 (refer to FIG. 6) described hereinabove are used. Therefore, the data retrieval apparatus, data storage method and data retrieval method according to the present embodiment are advantageous in that, when a hash value is calculated by a hash function, only it is necessary to access the CPU cache memory 111 so that the data retrieval speed can be improved without degrading the data retrieval efficiency and without lowering the data storage efficiency.

In particular, as a method of suppressing the calculation cost when a perfect hash function is calculated for a large-scale data set, the CHD algorithm is available wherein the large-scale data set is divided into a plurality of small-scale data sets and an individual perfect hash function is calculated for each of the plurality of small-scale data sets.

However, in the CHD algorithm, a number of perfect hash functions corresponding to the number of small-scale data sets are used. Therefore, as the scale of the data set increases, the information amount necessary to associate a hash function with each of the small-scale data stets increases and an increased memory area is used. In this instance, it is difficult to store all of the information into a CPU cash memory that has a high readout speed. Therefore, when a hash value is calculated by a hash function, access to the main memory occurs in a fixed probability, and since the speed of access to the main memory is as low as a several ten to several hundred times in comparison with that of access to the CPU cache memory, the data retrieval speed drops.

Further, in the CHD algorithm described above, as an individual perfect hash function corresponding to each of a plurality of small-scale data sets, a perfect hash function defined by the two hash functions f1 (x) and f2 (x) and the two operators α and β, namely, the expression x=f1 (x)+αf2 (x)+β, is calculated, and the hash value x is calculated using the perfect hash function. Then, the data is stored based on the hash value calculated by the perfect hash function to produce a hash table. However, time is required for the determination of the perfect hash function, calculation of the hash value and production of the hash table. Therefore, time is required for the storage of the data, and the data storage speed is low.

Further, in the CHD algorithm described hereinabove, the operators α and β of individual perfect hash functions corresponding to a plurality of small-scale data sets are compressed and retained, and then upon data retrieval, the compressed operators α and β are decompressed to obtain the original operators. Then, the original operators are used to calculate a hash value by the perfect hash functions described above, and data is retrieved using the calculated hash value. However, time is required for the calculation of the hash value. Therefore, time is required for the retrieval of the data and the data retrieval speed is low.

On the other hand, in order to improve the data retrieval speed, it seems a possible idea to utilize a small number of hash functions again, namely, to allocate one hash function to a plurality of small-scale data sets in place of allocation of one hash function to one small-scale data set thereby to reduce the number of hash functions to be used and reduce the information amount.

However, as long as a perfect hash function is used as a hash function as in the CHD algorithm, the number of hash functions cannot be reduced very much and it is difficult to sufficiently reduce the information amount. In other words, in order to sufficiently reduce the information amount, it is desirable to reduce the number of hash functions to be used to several tens or less. However, since the probability that a certain hash function may be a perfect hash function for a given small-scale data set is very low, it is difficult to select a perfect hash function for all small-scale data sets from several tens or less hash functions. Therefore, as long as a perfect hash function is used as a hash function, it is difficult to reduce the number of hash functions to be used until the information amount can be reduced sufficiently.

In this instance, if an imperfect hash function is used as a hash function, then it is possible to reduce the number of hash functions to be used and reduce the information amount. However, if an imperfect hash function is used as a hash function, then the data retrieval efficiency drops.

Also it seems a possible idea to reduce the storage efficiency of a hash table, for example, by storing seven data in place of storing eight data into a hash table of a size that can store 10 data thereby to raise the probability that a certain hash function may be a perfect hash function for a given small-scale data set, and reduce the number of hash functions to be used and reduce the information amount. However, this drops the storage efficiency of data. Thus, if a hash table of a low storage efficiency is used, then the memory usage is squeezed.

Therefore, in the data retrieval apparatus, data storage method and data retrieval method according to the present embodiment, a near-perfect hash function described hereinabove is used to re-utilize a small number of hash functions and the correspondence table 21 and the hash coefficient value table 20 (refer to FIG. 6) described hereinabove are used to make it possible to raise the data retrieval speed by making it necessary only to access the CPU cache memory 111 upon calculation of a hash value by a hash function without dropping the data retrieval efficiency and without degrading the data storage efficiency. In particular, it is possible to raise the cache hit ratio by reducing the information amount necessary to associate a hash function with each small-scale data set using a near-perfect hash function which improves the re-usability of a hash function significantly thereby to implement increase of the speed in data retrieval, while an equivalent data retrieval efficiency in comparison with a perfect hash function is maintained and an equivalent data storage efficiency in comparison with the CHD algorithm described hereinabove is maintained.

It is to be noted that, while, in the present embodiment, a case in which 16 hash functions are used is taken as an example and described, the number of hash functions is not limited to this. For example, 32 hash functions may be used. In this instance, since identifiers (index numbers) for identifying the 32 hash functions are represented by 5 bits, the information amount necessary for a correspondence table increases by approximately 25% in comparison with that where 16 hash functions are used. However, even if such the information amount as just mentioned increases, the information can be retained in the CPU cache memory, and therefore, high speed data retrieval can be implemented. On the other hand, if the number of hash functions to be used is increased, then the speed of the process for determining a hash function increases. This is because the possibility that a certain hash function may be adopted as a hash function in the decision regarding whether or not the threshold value thd is exceeded in the embodiment described above increases and the number of trials decreases. For example, where the number of data to be stored exceeds 500,000, it is preferable to use 32 hash functions. It is to be noted that, if the number of hash functions to be used is decreased to eight or less, then it becomes extremely difficult to adopt a certain hash function as a hash function in the decision regarding whether or not the threshold value thd is exceeded in the embodiment described hereinabove. Therefore, it is preferable to set the number of hash functions to be used to 16 or more. Here, if the number of hash functions to be used is represented by p, the information amount necessary to associate a hash function with each small-scale data set is ceil(log(p)). Therefore, when p is varied, the information amount necessary to associate a hash function with each small-scale data set varies in proportion to log(p). Therefore, in order to improve the cash hit ratio and achieve higher speed data retrieval, the number of hash functions to be used is determined so that the information amount necessary to associate a hash function with each small-scale data set (specifically the information amount necessary for a correspondence table) becomes the information amount according to the size of the CPU cache memory.

Further, the data retrieval apparatus, data storage method and data retrieval method according to the present embodiment described above can be used, for example, for exact match retrieval, longest match string retrieval and so forth. Here, the exact match retrieval is used, for example, for verification of a unique ID such as a commodity number, a model number, a barcode of a store, an employee number, a country code or a mail address and so forth. Meanwhile, the longest match string retrieval is used, for example, for a lexical analysis and a parsing (for example, a compiler), a morphological analysis (for example, a conversion process in a character inputting apparatus (IME)), a routing table retrieval in IP communication, a routing table retrieval in a telephone network, destination distribution of a luggage by a zip code in freight transport, longest match retrieval to a dictionary in data compression of the dictionary type and so forth.

In the following, as an example of the exact match retrieval, a case in which the data retrieval apparatus, data storage method and data retrieval method of the embodiment described above are applied to an employee ID retrieval system is taken as an example and described first. Then, as an example of the longest match string retrieval, a case in which the data retrieval apparatus, data storage method and data retrieval method are applied to a dictionary type data compression system is taken as an example and described.

[Employee ID Retrieval System as an Example of the Exact match Retrieval]

Here, the employee ID retrieval system as a data retrieval apparatus is a system that retrieves, from an employee ID, the name of an employee having the employee ID.

In the present employee ID retrieval system, if a storage request of such a data set as depicted in FIG. 10 is received, then the data set is stored in the following procedure into a hash table 22 produced in the main memory 101.

First, if the data storage processing unit 2 of the employee ID retrieval system receives such a data set of a storage target as depicted in FIG. 10, then it causes the data division unit 7 thereof to divide the data set of the storage target into a plurality of data sets as depicted in FIG. 12.

Here, the data storage processing unit 2 causes the data division unit 7 thereof to calculate a CRC32 value of a key of each of a plurality of data that configure the data set of the storage target and calculates a value of the remainder (CRC value) when each calculated CRC32 value is divided by the number of the small-scale data sets (here, 5). Then, the data set of the storage target including the plurality of data are divided into a plurality of small-scale data sets as depicted in FIG. 12 such that data whose calculated CRC values are equal to each other may be included in the same small-scale data set. In particular, the calculated CRC values are used as identification numbers (data set numbers) of the plurality of small-scale data sets to divide the data set of the storage target including the plurality of data into a plurality of small-scale data sets. For example, where a CPU which supports the SSE4.2 extended instruction set is used, the CRC32c operation instruction (built-in function name; crc32) built in as hardware can be used to divide the data set of the storage target including the plurality of data at a high speed into a plurality of small-scale data sets.

Then, the data storage processing unit 2 causes the hash function determination unit 8 thereof to determine a plurality of hash functions individually for the plurality of small-scale data sets as depicted in FIG. 13.

Then, the data storage processing unit 2 causes the hash coefficient value table production unit 9 (hash function entity management table production unit) thereof to produce a hash coefficient value table (hash function entity management table) in which values of a plurality of hash coefficients for individually specifying the plurality of hash functions are stored as depicted in FIG. 14.

Then, the data storage processing unit 2 causes the correspondence table production unit 10 (hash function index table production unit) thereof to produce a correspondence table (hash function index table) that associates the values of the plurality of hash coefficients for specifying the plurality of hash functions and the plurality of data sets with each other as depicted in FIG. 15.

Then, the data storage processing unit 2 causes the hash table production unit 11 thereof to produce a plurality of hash tables 22 individually for the plurality of data sets.

Here, the data storage processing unit 2 causes the hash table production unit 11 thereof to first determine a size of a hash table 22 corresponding to each small-scale data set. For example, when the number n' of data included in each small-scale data set is "4", the size of the hash table for each small-scale data set may be determined as "5" by ROUND (n'÷0.8). Consequently, by determining the size of the hash table 22 based on the size of each small-scale data set, the data storage ratio of the hash table 22 for each small-scale data set can be set to approximately 80%.

Then, the data storage processing unit 2 causes the hash table production unit 11 thereof to produce a hash table 22 for each small-scale data set and store the hash table 22 into the main memory 101.

Here, an index number acquired from the correspondence table using a CRC value that is an identification number of a small-scale data set is used to acquire a value of a hash coefficient for specifying a hash function allocated to the small-scale data set from the hash coefficient value table. Then, the value of the hash coefficient is used to calculate a hash value based on a key of each data included in the small-scale data set by a hash function allocated to the small-scale data set. Then, a value of the remainder when the calculated hash value is divided by the size of the hash table for the small-scale data set is calculated. Then, the data and the keys are stored into an address (first storage position) specified based on the hash value of the hash table for the small-scale data set in the main memory or a next address (second storage position) in the ascending order of the remainder to produce a hash table for each small-scale data set.

In particular, with regard to a small-scale data set whose identification number (data set number) is "0", namely, whose CRC value is "0", a hash value is calculated based on a key of each data included in the small-scale data set, and a value of the remainder when the calculated hash value is divided by the size (here, 5) of the hash table 22 for the small-scale data set of the data set number "0" is calculated. By the calculation, such a result as depicted in FIG. 16 is obtained. Then, the data and the keys are stored into an address (first storage position) specified based on the hash value of the hash table 22 for the small-scale data set of the data set number "0" in the main memory 101 or a next address (second storage position) in the ascending order of the remainder value to produce a hash table 22 for the small-scale data set of the data set number "0". As a result, such a hash table 22 as depicted in FIG. 17 is produced.

Similarly, with regard to a small-scale data set whose identification number (data set number) is "1", namely, whose CRC value is "1", a hash value is calculated based on a key of each data included in the small-scale data set, and a value of the remainder when the calculated hash value is divided by the size (here, 5) of the hash table 22 for the small-scale data set of the data set number "1" is calculated. By the calculation, such a result as depicted in FIG. 18 is obtained. Then, the data and the keys are stored into an address (first storage position) specified based on the hash value of the hash table 22 for the small-scale data set of the data set number "1" in the main memory 101 or a next address (second storage position) in the ascending order of the remainder value to produce a hash table 22 for the small-scale data set of the data set number "1". As a result, such a hash table 22 as depicted in FIG. 19 is produced.

Similarly, further with regard to a small-scale data set whose identification number (data set number) is "2", namely, whose CRC value is "2", a hash value is calculated based on a key of each data included in the small-scale data set, and a value of the remainder when the calculated hash value is divided by the size (here, 5) of the hash table 22 for the small-scale data set of the data set number "2" is calculated. By the calculation, such a result as depicted in FIG. 20 is obtained. Then, the data and the keys are stored into an address (first storage position) specified based on the hash value of the hash table 22 for the small-scale data set of the data set number "2" in the main memory 101 or a next address (second storage position) in the ascending order of the remainder value to produce a hash table 22 for the small-scale data set of the data set number "2". As a result, such a hash table 22 as depicted in FIG. 21 is produced.

Similarly, further with regard to a small-scale data set whose identification number (data set number) is "3", namely, whose CRC value is "3", a hash value is calculated based on a key of each data included in the small-scale data set, and a value of the remainder when the calculated hash value is divided by the size (here, 5) of the hash table 22 for the small-scale data set of the data set number "3" is calculated. Such a result as depicted in FIG. 22 is obtained. Then, the data and the keys are stored into an address (first storage position) specified based on the hash value of the hash table 22 for the small-scale data set of the data set number "3" in the main memory 101 or a next address (second storage position) in the ascending order of the remainder value to produce a hash table 22 for the small-scale data set of the data set number "3". As a result, such a hash table 22 as depicted in FIG. 23 is produced.

Similarly, further with regard to a small-scale data set whose identification number (data set number) is "4", namely, whose CRC value is "4", a hash value is calculated based on a key of each data included in the small-scale data set, and a value of the remainder when the calculated hash value is divided by the size (here, 5) of the hash table 22 for the small-scale data set of the data set number "4" is calculated. Such a result as depicted in FIG. 24 is obtained. Then, the data and the keys are stored into an address (first storage position) specified based on the hash value of the hash table 22 for the small-scale data set of the data set number "4" in the main memory 101 or a next address (second storage position) in the ascending order of the remainder value to produce a hash table 22 for the small-scale data set of the data set number "4". As a result, such a hash table 22 as depicted in FIG. 25 is produced.

Incidentally, if a retrieval request of data is received, then the present employee ID retrieval system performs data retrieval in the following procedure in a plurality of hash tables 22 in the main memory 101.

Here, a case in which an employee ID "0110" is received as a key for retrieval target data is taken as an example and described.

Figure 26:
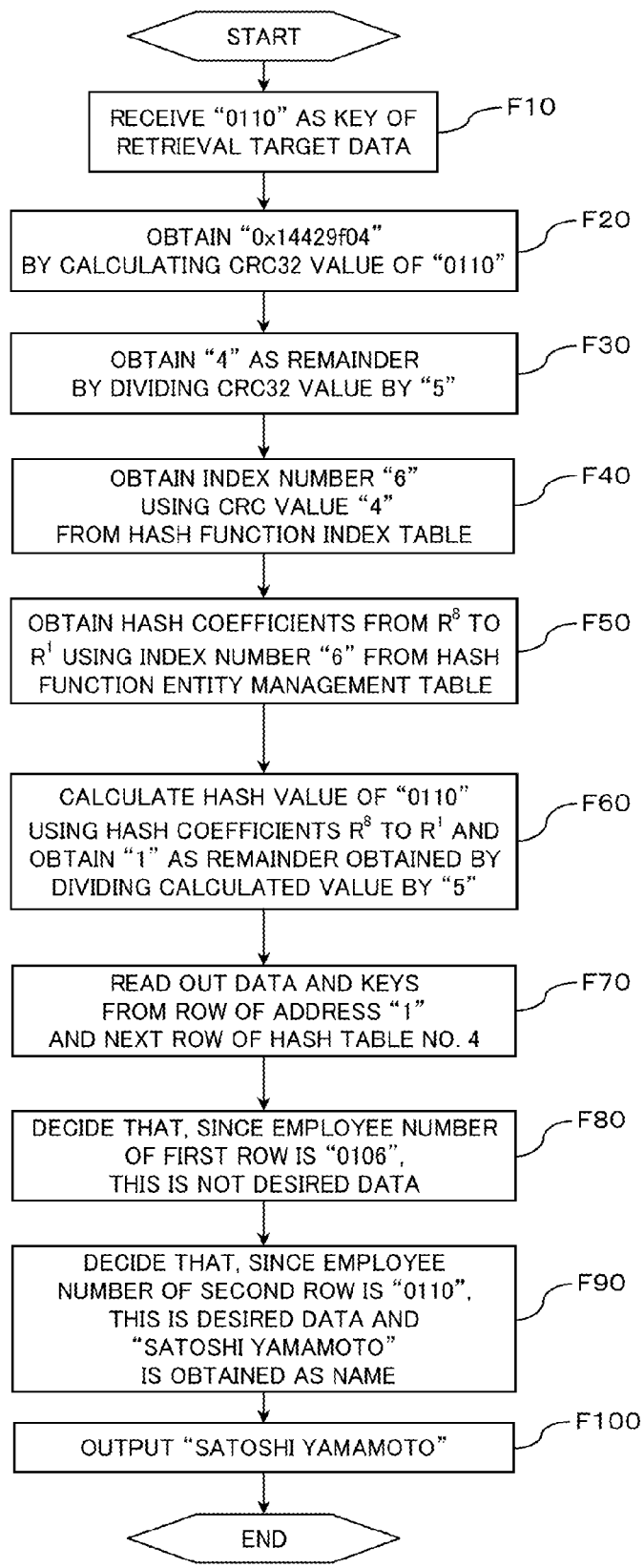
FIG. 26 is a flow chart illustrating processes (data retrieval method) by a data retrieval processing unit (data retrieval program) in the employee ID retrieval system to which the data retrieval apparatus according to the present embodiment is applied.

First, as depicted in FIG. 26, the data retrieval processing unit 3 of the employee ID retrieval system causes the hash table specification unit 12 thereof to specify one hash table 22 that stores one data set including the retrieval target data based on the key of the retrieval target data from among a plurality of hash tables 22 that individually store a plurality of data sets divided from a data set.

Here, when the employee ID "0110" is received as the key of the retrieval target data (step F10), the data retrieval processing unit 3 causes the hash table specification unit 12 thereof to calculate a CRC32 value of the employee ID "0110" as the key of the retrieval target data (step F20). Then, a value of the remainder (CRC value; here, "4") when the calculated CRC32 value (here, "0x14429f04") is divided by the number of small-scale data sets (here, "5") is calculated (step F30).

Then, the data retrieval processing unit 3 causes the hash coefficient value acquisition unit 13 thereof to acquire, based on the key of the retrieval target data, a value of one hash coefficient for specifying one hash function corresponding to one data set using a correspondence table (refer to FIG. 15) that associates a plurality of data sets and values of hash coefficients that individually specify a plurality of hash functions with each other and a hash coefficient value table (refer to FIG. 14) that stores the values of the plurality of hash coefficients that individually specify the plurality of hash functions (steps F40 and F50).

Here, the data retrieval processing unit 3 causes the hash coefficient value acquisition unit 13 thereof to acquire an index number (here, "6") using the CRC value (here, "4") calculated based on the key of the retrieval target data in such a manner as described hereinabove and using the correspondence table (refer to FIG. 15) in the CPU cache memory 111 (step F40). Then, a values (here, a value of $R^1$ to $R^8$) of a hash coefficient for specifying a hash function corresponding to a data set including the retrieval target data is acquired from the hash coefficient value table (refer to FIG. 14) in the CPU cache memory 111 using the acquired index number (here, "6") (step F50).

Thereafter, the data retrieval processing unit 3 causes the hash value calculation unit 14 thereof to calculate a hash value by one hash function using the key of the retrieval target data and the value of one hash coefficient (step F60).

Here, the data retrieval processing unit 3 causes the hash value calculation unit 14 thereof to calculate, using the key of the retrieval target data (here, the employee ID "0110") and the value (here, the value of $R^1$ to $R^8$) of the hash coefficient that is acquired in such a manner as described above and specifies the hash function corresponding to the data set including the retrieval target data, a hash value by one hash function, where a key string $\{x_1, x_2, x_3, \ldots, x_n\}$ of data is represented as $x_K$ ($1 \leq K \leq n$), specified by a value of a hash coefficient R ($1 \leq R \leq 256$) and included in a function group represented by $f_R(x_K)=f_R(x_{K-1}) \times R + x_K$ [where $f_R(x_0)=R_0$ ($R_0$ is an initial value)] (step F60). Then, a value of the remainder when the calculated hash value is divided by the size (here, "5") of the hash table 22 with respect to the data set including the retrieval target data is calculated, and "1" is obtained as the remainder value (step F60).

Then, the data retrieval processing unit 3 causes the readout unit 15 thereof to read out data and keys stored in a first storage position specified based on the hash value and a second storage position contiguous to the first storage position from one hash table 22 (step F70).

Here, the data retrieval processing unit 3 causes the readout unit 15 thereof to read out data and keys stored in an address (first storage position; here, "1") specified by the remainder value (here, "1") when the hash value calculated in such a manner as described above is divided by the size of the hash table 22 and in a next address (second storage position; here, "2") from the main memory 101, particularly from the hash table (fourth hash table) 22 specified by the CRC value (here, "4") calculated based on the key of the retrieval target data in such a manner as described hereinabove (step F70).

Then, the data retrieval processing unit 3 causes the outputting unit 16 thereof to output, when it is decided that the key read out from the first storage position or the second storage position coincides with the key of the retrieval target data, data associated with the key decided to be coincident as retrieval target data (steps F80 to F100).

Here, the data retrieval processing unit 3 causes the outputting unit 16 thereof to first decide whether or not the key (here, "0106") read out from the address (here, "1") specified based on the hash value coincides with the key (here, "0110") of the retrieval target data (step F80). Then, it is decided whether or not the key (here, "0110") read out from the address (here, "2") next to the address specified based on the hash value coincides with the key (here, "0110") of the retrieval target data (step F90). It is decided as a result of the decisions that the key read out from the address (here, "2") next to the address specified based on the hash value coincides with the key of the retrieval target data. Then, data (here, "Satoshi Yamamoto") associated with the key (here, "0110") read out from the address (here, "2") next to the address specified based on the hash value is obtained (step F90) and outputted as the retrieval target data (step F100).

Accordingly, by applying the data retrieval apparatus described hereinabove to such an employee ID retrieval system as described above, there is an advantage that the data storage speed and the data retrieval speed can be improved while degradation of the data retrieval efficiency is suppressed as far as possible.

Here, in the dictionary type data compression system, the data retrieval apparatus 1 (data storage method and data retrieval method) described hereinabove is used as a dictionary for data compression, and by providing a character string (compressed character string) to the data retrieval apparatus 1, a compression code corresponding to the character string can be obtained. In this case, the storage target data is a compression code, and the key of the storage target data is a compressed character string. It is to be noted that a dictionary type data compression system is disclosed, for example, in Japanese Laid-Open Patent Application No. Hei 9-218877, the entire content of which is incorporated herein by reference or Japanese Laid-Open Patent Application No. 2011-221845, the entire content of which is incorporated herein by reference.

If a storage request for such a data set as illustrated in FIG. 27 is received, then the dictionary type data compression system stores the data set in the following procedure into a hash table 22 produced in the main memory 101.

First, if such a data set of the storage target as illustrated in FIG. 27 is received, then the data storage processing unit 2 of the data retrieval apparatus 1 described hereinabove, which is provided in the dictionary type data compression system, causes the data division unit 7 thereof to divide the data set of the storage target into a plurality of data sets as illustrated in FIG. 29.

Here, the data storage processing unit 2 causes the data division unit 7 thereof to calculate a CRC32 value of a key of each of a plurality of data that configure the data set of the target object and calculate a value of the remainder (CRC value) when each calculated CRC32 value is divided by the number of the small-scale data sets (here, 4). Then, the data set of the storage target including the plurality of data is divided into a plurality of small-scale data sets such that data whose calculated CRC values are equal to each other are included in the same small-scale data set as illustrated in FIG. 29. In other words, the calculated CRC values are used as identification numbers (data set numbers) of the plurality of small-scale data sets to divide the data set of the storage target including the plurality of data into a plurality of small-scale data sets. For example, where a CPU that supports the SSE4.2 extended instruction set is used, the data set of the strange target including the plurality of data can be divided into a plurality of small-scale data sets at a high speed using the CRC32c operation instruction (built-in function name: crc32) built in as hardware.

Then, the data storage processing unit 2 causes the hash function determination unit 8 thereof to determine a plurality of hash functions for the plurality of small-scale data sets as illustrated in FIG. 30.

Then, the data storage processing unit 2 causes the hash coefficient value table production unit 9 (hash function entity management table production unit) thereof to produce a hash coefficient value table (hash function entity management table) that stores values of the plurality of hash coefficients that individually specify the plurality of hash functions as illustrated in FIG. 31.

Then, the data storage processing unit 2 causes the correspondence table production unit 10 (hash function index table production unit) thereof to produce a correspondence table (hash function index table) that associates values of the plurality of hash coefficients that individually specify the plurality of hash functions and the plurality of data sets with each other as illustrated in FIG. 32.

Then, the data storage processing unit 2 causes the hash table production unit 11 thereof to produce a plurality of hash tables 22 individually for the plurality of data sets.

Here, the data storage processing unit 2 causes the hash table production unit 11 thereof to first determine a size of a hash table 22 corresponding to each small-scale data set. For example, where the number n' of data included in each small-scale data set is "3", the size of the hash table 22 for each small-scale data set may be set to "4" by ROUND (n'÷0.8). Meanwhile, for example, where the number n' of data included in each small-scale data set is "4", the size of the hash table for each small-scale data set may be set to "5" by ROUND (n'÷0.8). Consequently, by determining the size of the hash tables 22 based on the size of each small-scale data set, the data storage efficiency of the hash table 22 for each small-scale data set can be set to approximately 80%.

Thereafter, the data storage processing unit 2 causes the hash table production unit 11 thereof to produce a hash table 22 for each small-scale data set and store the hash table 22 into the main memory 101.

Here, a value of a hash coefficient that specifies a hash function allocated to a small-scale data set is acquired using the index number acquired from the correspondence table using the CRC value that is an identification number of the small-scale data set. Then, using the acquired value of the hash coefficient, a hash value is calculated based on the key of each of the data included in the small-scale data set by the hash function allocated to the small-scale data set. Then, a value of the remainder when the calculated hash value is divided by the size of the hash table 22 with respect to the small-scale data set is calculated. Then, the data and the keys are stored into an address (first storage position) specified based on the hash value of the hash table 22 for the small-scale data set in the main memory 101 or a next address (second storage position) in the ascending order of the remainder value to produce a hash table 22 for each small-scale data set.

In particular, with regard to a small-scale data set whose identification number (data set number) is "0", namely, whose CRC value is "0", a hash value is calculated based on a key of each data included in the small-scale data set, and a value of the remainder when the calculated hash value is divided by the size (here, 4) of the hash table 22 for the small-scale data set of the data set number "0" is calculated. By the calculation, such a result as depicted in FIG. 33 is obtained. Then, the data and the keys are stored into an address (first storage position) specified based on the hash value of the hash table 22 for the small-scale data set of the data set number "0" in the main memory 101 or a next address (second storage position) in the ascending order of the remainder value to produce a hash table 22 for the small-scale data set of the data set number "0". As a result, such a hash table 22 as depicted in FIG. 34 is produced.

Similarly, with regard to a small-scale data set whose identification number (data set number) is "1", namely, whose CRC value is "1", a hash value is calculated based on a key of each data included in the small-scale data set, and a value of the remainder when the calculated hash value is divided by the size (here, 5) of the hash table 22 for the small-scale data set of the data set number "1" is calculated. By the calculation, such a result as depicted in FIG. 35 is obtained. Then, the data and the keys are stored into an address (first storage position) specified based on the hash value of the hash table 22 for the small-scale data set of the data set number "1" in the main memory 101 or a next address (second storage position) in the ascending order of the remainder value to produce a hash table 22 for the small-scale data set of the data set number "1". As a result, such a hash table 22 as depicted in FIG. 36 is produced.

Similarly, further with regard to a small-scale data set whose identification number (data set number) is "2", namely, whose CRC value is "2", a hash value is calculated based on a key of each data included in the small-scale data set, and a value of the remainder when the calculated hash value is divided by the size (here, 4) of the hash table 22 for the small-scale data set of the data set number "2" is calculated. By the calculation, such a result as depicted in FIG. 37 is obtained. Then, the data and the keys are stored into an address (first storage position) specified based on the hash value of the hash table 22 for the small-scale data set of the data set number "2" in the main memory 101 or a next address (second storage position) in the ascending order of the remainder value to produce a hash table 22 for the small-scale data set of the data set number "2". As a result, such a hash table 22 as depicted in FIG. 38 is produced.

Similarly, further with regard to a small-scale data set whose identification number (data set number) is "3", namely, whose CRC value is "3", a hash value is calculated based on a key of each data included in the small-scale data set, and a value of the remainder when the calculated hash value is divided by the size (here, 5) of the hash table 22 for the small-scale data set of the data set number "3" is calculated. Such a result as depicted in FIG. 39 is obtained. Then, the data and the keys are stored into an address (first storage position) specified based on the hash value of the hash table 22 for the small-scale data set of the data set number "3" in the main memory 101 or a next address (second storage position) in the ascending order of the remainder value to produce a hash table 22 for the small-scale data set of the data set number "3". As a result, such a hash table 22 as depicted in FIG. 40 is produced.

Incidentally, if this dictionary type data compression system receives a retrieval request for data, namely, a character string retrieval request for data compression, then it performs data retrieval (character string retrieval) in the following procedure with regard to a plurality of hash tables 22 in the main memory 101.

Here, a case in which a compression character string "aa" is received as a key for retrieval target data (compression code) is taken as an example and described.

Figure 41:
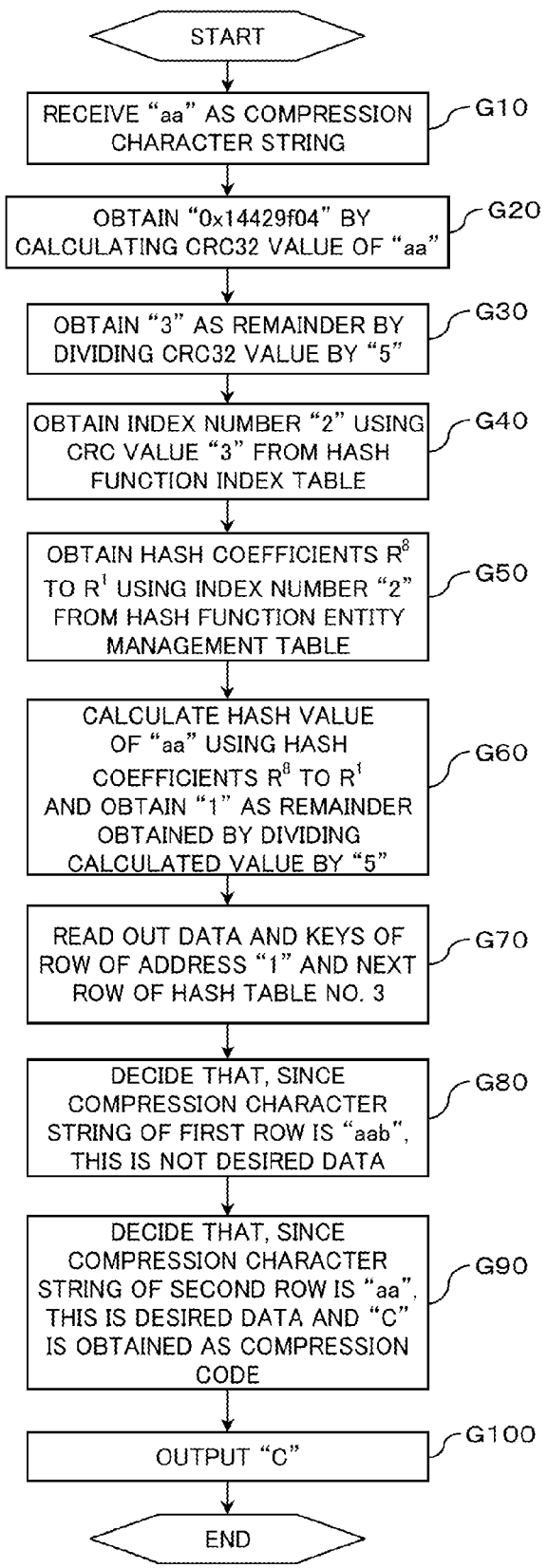
FIG. 41 is a flow chart illustrating processes (data retrieval method) by a data retrieval processing unit (data retrieval program) in the dictionary type data compression system to which the data retrieval apparatus according to the present embodiment is applied.
Figure 42:
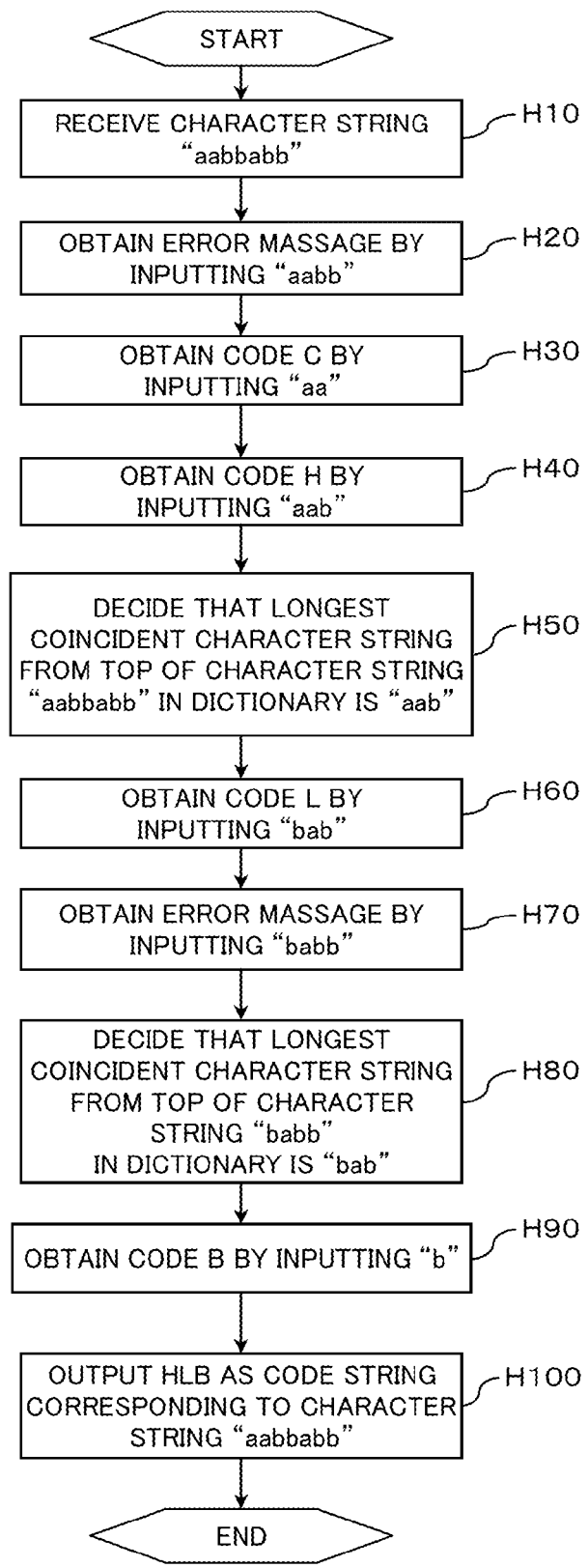
FIG. 42 is a flow chart illustrating a data compression process including processes (data retrieval method) by the data retrieval processing unit (data retrieval program) in the dictionary type data compression system to which the data retrieval apparatus according to the present embodiment is applied.

First, as illustrated in FIG. 41, the data retrieval processing unit 3 of the data retrieval apparatus 1 provided in the dictionary type data compression system causes the hash table specification unit 12 thereof to specify, from among a plurality of hash tables 22 that individually store a plurality of data sets divided from a data set, one hash table 22 that stores a data set including the retrieval target data based on the key of the retrieval target data.

Here, when the data retrieval processing unit 3 receives the compression character string "aa" as the key of the retrieval target data (step G10), it causes the hash table specification unit 12 thereof to calculate a CRC32 value of the compression character string "aa" as the key of the retrieval target data (step G20). Then, a value of the remainder (CRC value; here, "3") when the calculated CRC32 value (here, "0x14429f04") is divided by the number of the small-scale data sets (here, "5") is calculated (step G30).

Then, the data retrieval processing unit 3 causes the hash coefficient value acquisition unit 13 thereof to acquire, based on the key of the retrieval target data, a value of one hash coefficient that specifies one hash function corresponding to one data set using the correspondence table (refer to FIG. 32) that associates the plurality of data sets and values of the hash coefficients for specifying the plurality of hash functions with each other and the hash coefficient value table (refer to FIG. 31) that stores the values of the plurality of hash coefficients for specifying the plurality of hash functions (steps G40 and G50).

Here, the data retrieval processing unit 3 causes the hash coefficient value acquisition unit 13 thereof to acquire an index number (here, "2") using the correspondence table (refer to FIG. 32) in the CPU cache memory 111 using the CRC value (here, "3") calculated based on the key of the retrieval target data in such a manner as described above (Step G40). Then, using the index number (here, "2"), a value of the hash coefficient (here, the value of $R^1$ to $R^8$) that specifies a hash function corresponding to the data set including the retrieval target data from the hash coefficient value table (refer to FIG. 31) in the CPU cache memory 111 (step G50).

Then, the data retrieval processing unit 3 causes the hash value calculation unit 14 thereof to calculate a hash value by one hash function using the key of the retrieval target data and a value of one hash coefficient (step G60).

Here, the data retrieval processing unit 3 causes the hash value calculation unit 14 thereof to calculate, using the key (here, the compression character string "aa") of the retrieval target data and the value (here, the value of $R^1$ to $R^8$) of the hash coefficient that has been acquired in such a manner as described above and specifies the hash function corresponding to the data set including the retrieval target data, a hash value by one hash function where the key string $\{x_1, x_2, x_3, \ldots, x_n\}$ of the data is represented as $x_K$ ($1 \leq K \leq n$) specified, by a value of the hash coefficient R ($1 \leq R \leq 256$) and included in a function group represented by $f_R(x_K) = f_R(x_{K-1}) \times R + x_K$ [where $f_R(x_0) = R_0$ ($R_0$ is an initial value)] (step G60). Then, a value of the remainder when the calculated hash value is divided by the size (here, "5") of the hash table 22 with respect to the data set including the retrieval target data is calculated, and "1" is obtained as the remainder value (step G60).

Then, the data retrieval processing unit 3 causes the readout unit 15 thereof to read out data and keys stored in a first storage position specified based on the hash value and a second storage position contiguous to the first storage position from one hash table 22 (step G70).

Here, the data retrieval processing unit 3 causes the readout unit 15 to read out data and keys stored in an address (first storage position; here, "1") specified by the remainder value (here, "1") when the hash value calculated in such a manner as described above is divided by the size of the hash table 22 and in a next address (second storage position; here, "2") from the main memory 101, particularly from the hash table (third hash table) 22 specified by the CRC value (here, "3") calculated based on the key of the retrieval target data in such a manner as described hereinabove.

Then, the data retrieval processing unit 3 causes the outputting unit 16 thereof to output, when it is decided that the key read out from the first storage position or the second storage position coincides with the key of the retrieval target data, data associated with the key decided to be coincident as retrieval target data (steps G80 to G100).

Here, the data retrieval processing unit 3 causes the outputting unit 16 thereof to first decide whether or not the key (here, "aab") read out from the address (here, "1") specified based on the hash value coincides with the key (here, "aa") of the retrieval target data (step G80). Then, it is decided whether or not the key (here, "aa") read out from the address (here, "2") next to the address specified based on the hash value coincides with the key (here, "aa") of the retrieval target data (step G90). It is decided as a result of the decisions that the key read out from the address (here, "2") next to the address specified based on the hash value coincides with the key of the retrieval target data. Then, data (here, "C") associated with the key (here, "aa") read out from the address (here, "2") next to the address specified based on the hash value is obtained (step G90) and outputted as the compression code that is the retrieval target data (step G100).

Incidentally, in the dictionary type data compression system wherein the data retrieval apparatus (data storage method and data retrieval method) described hereinabove is used as a dictionary for data compression, making use of the nature that the retrieval processing time does not rely upon the length of the retrieval target character string, a given character string can be compressed to obtain a compression code string by a procedure for discovering a longest coincident character string from the top of the given character string in the following manner by the binary tree search method and sequential application of the procedure. In contrast, where a Prefix tree is used, since the retrieval processing time increases in proportion to the length of the retrieval target character string, where the longest coincident character string from the top is long, the time required for discovery of the longest coincident character string becomes long and the data compression processing time becomes long.

Here, a case in which a character string "aabbabb" is compressed to obtain a compression code string in the dictionary type data compression system is taken as an example and described.

First, when the dictionary type data compression system receives a compression request for the character string "aabbabb" (step H10), it first inputs the character string "aabb" into the data retrieval apparatus 1 described hereinabove (step H20). Then, when the data retrieval apparatus 1 described above receives the compression character string "aabb" as a key of the retrieval target data (compression code), it performs processes similar to those described hereinabove and outputs an error message. Therefore, the dictionary type data compression system obtains the error message with regard to the character string "aabb" (step H20).

Then, the dictionary type data compression system inputs the character string "aa" to the data retrieval apparatus 1 (step H30). Then, when the data retrieval apparatus 1 described above receives the compression code string "aa" as the key of the retrieval target data (compression code), it performs processes similar to those described hereinabove and outputs "C" as a compression code that is the retrieval target data. Therefore, the dictionary type data compression system obtains "C" as the compression code with regard the character string "aa" (step H30).

Then, the dictionary type data compression system inputs the character string "aab" to the data retrieval apparatus 1 described above (step H40). Then, when the data retrieval apparatus 1 described above receives the compression code string "aab" as the key of the retrieval target data (compression code), it performs processes similar to those described hereinabove and outputs "H" as a compression code that is the retrieval target data. Therefore, the dictionary type data compression system obtains "H" as the compression code with regard to the character string "aab" (step H40).

When the dictionary type data compression system obtains the error message with regard to the compression code string "aabb" and obtains the compression code "C" with regard to the compression code string "aa" and then obtains the compression code "H" with regard to the compression code string "aab" in this manner, it decides that the longest coincident character string from the top of the character string (aabbabb) in the dictionary is "aab" (step H50).

Thereafter, the dictionary type data compression system inputs the character string "bab" to the data retrieval apparatus 1 described hereinabove (step H60). Then, when the data retrieval apparatus 1 described hereinabove receives the compression character string "bab" as the key of the retrieval target data (compression code), it performs processes similar to those described hereinabove and outputs "L" as the compression code that is the retrieval target data. Therefore, the dictionary type data compression system obtains "L" as the compression code with regard to the character string "bab" (step H60).

Then, the dictionary type data compression system inputs the character string "babb" to the data retrieval apparatus 1 described hereinabove (step H70). Then, when the data retrieval apparatus 1 receives the compression code string "babb" as the key of the retrieval target data (compression code), it performs processes similar to those described hereinabove and outputs an error message. Therefore, the dictionary type data compression system obtains the error message with regard to the character string "babb" (step H70).

When the compression code "L" is obtained with regard to the compression character string "bab" and the error message is obtained with regard to the compression character string "babb" in this manner, the dictionary type data compression system decides that the longest coincident character string from the top of the character string "babb" in the dictionary is "bab" (step H80).

Then, the dictionary type data compression system inputs the character string "b" to the data retrieval apparatus 1 described hereinabove (step H90). Then, when the data retrieval apparatus 1 described above receives the compression character string "b" as the key of the retrieval target data "compression code", it performs processes similar to those described hereinabove and outputs "B" as the compression code that is the retrieval target data. Therefore, the dictionary type data compression system obtains "B" as the compression code with regard to the character string "b" (step H90).

Then, the dictionary type data compression system obtains, based on the compression code "H" with regard to the compression code string "aab", compression code L with regard to the compression character string "bab" and compression code "B" with regard to the compression code string "b" obtained in such a manner as described above, "HLB" as a compression code string that is a compressed form of the character string "aabbabb" and outputs "HLB" (step H100).

Accordingly, since such a dictionary type data compression system as described above uses the data retrieval apparatus 1 described hereinabove as a dictionary for data compression, it is advantageous in that the data storage speed and the data retrieval speed can be increased while degradation of the data retrieval efficiency is suppressed as far as possible. For example, if a correspondence table and a hash coefficient value table that are used for calculation of a hash value for accessing to the hash tables 22 that configure a dictionary is stored into the CPU cache memory 111, then the dictionary type data compression system can raise the speed of the data compression process and improve the responsibility to a data updating request or a data insertion request from a user.

It is to be noted that the present invention is not limited to the configuration described hereinabove in connection with the embodiment but can be modified in various manners without departing from the spirit and scope of the present invention.

For example, in the embodiment described above, the data retrieval apparatus is configured such that a data storage program or a data retrieval program is installed in a computer. However, the data storage program or the data retrieval program for causing a computer to execute the processes in the embodiment described hereinabove (namely a data storage program and a data retrieval program for causing a computer to implement such functions as described hereinabove) may be provided in a state in which they are stored in a computer-readable recording medium.

Here, the recording medium includes any medium that can store a program such as, for example, a memory such as a semiconductor memory and a disk such as a magnetic disk, an optical disk [for example, a CD (Compact Disc)-ROM, a DVD (Digital Versatile Disk), a Blu-ray disk and so forth], and a magneto-optical disk (MO). It is to be noted that a magnetic disk, an optical disk, a magneto-optical disk and so forth are called portable recording medium.

In this instance, the data storage program or the data retrieval program is read out from the portable recording medium through a drive apparatus, and the read out data storage program or data retrieval program is installed into a storage apparatus. As a result of the installation, the data retrieval apparatus, data storage method and data retrieval method described hereinabove in connection with the embodiment are implemented, and the processes in the embodiment are performed by the CPU reading out and executing the data storage program or the data retrieval program installed in the storage apparatus. It is to be noted that also it is possible for the computer to read out the program directly from the portable recording medium and execute processing in accordance with the program.

Further, the data storage program or the data retrieval program for causing a computer to execute the processes in the embodiment may be provided, for example, through a network as a transmission medium (for example, the Internet, a communication circuit such as a public circuit or a dedicated circuit or the like).

For example, a program provider may install a data storage program or a data retrieval program provided on a different computer such as, for example, a server into the storage apparatus through a network such as, for example, the Internet or a LAN and a communication interface. As a result of such installation, the data retrieval apparatus, data storage method and data retrieval method described hereinabove in connection with the embodiment are implemented, and the processes in the embodiment are performed by the CPU reading out and executing the data storage program or the data retrieval program installed in the storage apparatus similarly as in the case of the embodiment described hereinabove. It is to be noted that the computer may successively execute, every time a program is transferred thereto from a different computer such as, for example, a server, processing in accordance with the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a data storage program for causing a computer to execute a data storage process comprising:
   dividing a data set into a plurality of data sets;
   determining a plurality of hash functions corresponding to the plurality of data sets;
   producing hash coefficient value information including values of a plurality of hash coefficients that specify the plurality of hash functions;
   producing correspondence information that associates values of the plurality of hash coefficients that specify the plurality of hash functions and the plurality of data sets with each other; and
   producing a plurality of hash information corresponding to the plurality of data sets; wherein
   the determining the plurality of hash functions includes:
   calculating, for each of the data sets, a hash value using a candidate hash function based on keys of a plurality of data included in the data set and deciding whether or not all of the plurality of data can be stored into a first storage position specified based on the hash value or a second storage position contiguous to the first storage position; and
   determining the candidate hash function as the hash function corresponding to the data set with regard to which it is decided that all of the plurality of data can be stored into the first storage position or the second storage position; and
   the producing the plurality of hash information includes producing the hash information for the data set by storing, for each of the data sets, the data and the keys into the first storage position specified based on the hash value calculated using the hash function corresponding to the data set or the second storage position based on the keys of the plurality of data.

2. The non-transitory computer-readable recording medium having stored therein a data storage program according to claim 1, wherein the producing the
   correspondence information includes producing the correspondence information having an information amount which can be retained in a cache memory; and
   the producing the hash coefficient value information includes producing the hash coefficient value information having an information amount which can be retained in the cache memory.

3. The non-transitory computer-readable recording medium having stored therein a data storage program according to claim 1, wherein, in the determining the plurality of hash functions, where a key string $\{x_1, x_2, x_3, \ldots, x_n\}$ of data is represented as $x_K$ ($1 \leq K \leq n$), the hash function specified by a value of a hash coefficient R ($1 \leq R \leq 256$) and included in a function group represented by $f_R(x_K) = f_R(x_{K-1}) \times R + x_K$ [where $f_R(x_0) = R_0$ ($R_0$ is an initial value)] is used as the candidate hash function.

4. The non-transitory computer-readable recording medium having stored therein a data storage program according to claim 1, wherein the determining the plurality of hash functions includes determining, when two or more data sets are found with regard to which it is decided that all of the plurality of data can be stored in the first storage position or the second storage position, the candidate hash function as the hash function corresponding to two or more data sets; and
   the producing the correspondence information includes producing the correspondence information that associates a value of a hash coefficient that specifies one hash function and the two or more data sets with each other.

5. The non-transitory computer-readable recording medium having stored therein a data storage program according to claim 1, wherein the determining the plurality of hash functions includes determining 16 or 32 hash functions as the plurality of hash functions corresponding to the plurality of data sets; and the producing the correspondence information includes producing the correspondence information associating values of the plurality of hash coefficients that specify the plurality of hash functions and the plurality of data sets with each other and including a plurality of indexes configured from 4 bits or 5 bits.

6. A non-transitory computer-readable recording medium having stored therein a data retrieval program for causing a computer to execute a data retrieval process comprising:
specifying one hash information that stores one data set including retrieval target data based on a key of the retrieval target data from among a plurality of hash information that store a plurality of data sets obtained by dividing a data set;
acquiring a value of one hash coefficient that specifies, based on the key of the retrieval target data, one hash function corresponding to the one data set using correspondence information that associates the plurality of data sets and values of hash coefficients that specify a plurality of hash functions with each other, and hash coefficient value information including values of a plurality of hash coefficients that specify the plurality of hash functions;
calculating a hash value by the one hash function using the key of the retrieval target data and the value of the one hash coefficient;
reading out data and a key stored in a first storage position specified based on the hash value and a second storage position contiguous to the first storage position from the one hash information; and
outputting, when it is decided that the key read out from the first storage position or the second storage position coincides with the key of the retrieval target data, data associated with the key decided as the coincident key as the retrieval target data.

7. The non-transitory computer-readable recording medium having stored therein a data retrieval program according to claim 6, wherein the correspondence information and the hash coefficient value information have an information amount which can be retained in a cache memory.

8. The non-transitory computer-readable recording medium having stored therein a data retrieval program according to claim 6, wherein, where a key string $\{x_1, x_2, x_3, \ldots, X_n\}$ of data is represented as $x_K$ ($1 \leq K \leq n$), the plurality of hash functions are specified by a value of a hash coefficient R ($1 \leq R \leq 256$) and is included in a function group represented by $f_R(x_K) = f_R(x_{K-1}) \times R + x_K$ [where $f_R(x_0) = R_0$ ($R_0$ is an initial value)].

9. The non-transitory computer-readable recording medium having stored therein a data retrieval program according to claim 6, wherein the correspondence information associates a value of a hash coefficient that specifies one hash function and two or more data sets with each other.

10. The non-transitory computer-readable recording medium having stored therein a data retrieval program according to claim 6, wherein the plurality of hash functions are 16 or 32 hash functions; and
the correspondence information includes a plurality of indexes that associate the plurality of data sets and the values of the hash coefficients that specify the plurality of hash functions with each other, and each of the plurality of indexes is configured from 4 bits or 5 bits.

11. A data storage apparatus, comprising:
a processor;
wherein the processor executes a process including:
dividing a data set into a plurality of data sets;
determining a plurality of hash functions corresponding to the plurality of data sets;
producing hash coefficient value information including values of a plurality of hash coefficients that specify the plurality of hash functions;
producing correspondence information that associates values of the plurality of hash coefficients that specify the plurality of hash functions and the plurality of data sets with each other; and
producing a plurality of hash information corresponding to the plurality of data sets; wherein the determining the plurality of hash functions includes:
calculating, for each of the data sets, a hash value using a candidate hash function based on a key of a plurality of data included in the data set and decides whether or not all of the plurality of data can be stored into a first storage position specified based on the hash value or a second storage position contiguous to the first storage position; and
determining the candidate hash function as the hash function corresponding to the data set with regard to which it is decided that all of the plurality of data can be stored into the first storage position or the second storage position; and
the producing the plurality of hash information includes producing the hash information for the data set by storing, for each of the data sets, the data and the keys into the first storage position specified based on the hash value calculated using the hash function corresponding to the data set or the second storage position based on keys of the plurality of data.

12. The data storage apparatus according to claim 11, wherein the producing the correspondence information includes producing the correspondence information having an information amount which can be retained in a cache memory; and
the producing the hash coefficient value information includes producing the hash coefficient value information having an information amount which can be retained in the cache memory.

13. The data storage apparatus according to claim 11, wherein, in the determining the plurality of hash functions, where a key string $\{x_1, x_2, x_3, \ldots, x_n\}$ of data is represented as $x_K$ ($1 \leq K \leq n$), the hash function specified by a value of a hash coefficient R ($1 \leq R \leq 256$) and included in a function group represented by $f_R(x_K) = f_R(x_{K-1}) \times R + x_K$ [where $f_R(x_o) = R_o$ ($R_o$ is an initial value)] as the candidate hash function.

14. The data storage apparatus according to claim 11, wherein the determining the plurality of hash functions includes determining, when two or more data sets are found with regard to which it is decided that all of the plurality of data can be stored in the first storage position or the second storage position, the candidate hash function as the hash function corresponding to two or more data sets; and
the producing the correspondence information includes producing the correspondence information that associates a value of a hash coefficient that specifies one hash function and the two or more data sets with each other.

15. A data retrieval apparatus, comprising:
a processor;
wherein the processor executes a process including:
specifing one hash information that stores one data set including retrieval target data based on a key of the retrieval target data from among a plurality of hash information that store a plurality of data sets obtained by dividing a data set;

acquiring a value of one hash coefficient that specifies, based on the key of the retrieval target data, one hash function corresponding to the one data set using correspondence information that associates the plurality of data sets and values of hash coefficients that specify a plurality of hash functions with each other, and hash coefficient value information including values of a plurality of hash coefficients that specify the plurality of hash functions;

calculating a hash value by the one hash function using the key of the retrieval target data and the value of the one hash coefficient;

reading out data and a key stored in a first storage position specified based on the hash value and a second storage position contiguous to the first storage position from the one hash information; and outputting, when it is decided that the key read out from the first storage position or the second storage position coincides with the key of the retrieval target data, data associated with the key decided as the coincident key as the retrieval target data.

16. A data storage method, comprising:

dividing, using a processor, a data set into a plurality of data sets;

determining, using a processor, a plurality of hash functions corresponding to the plurality of data sets;

producing, using a processor, hash coefficient value information including values of a plurality of hash coefficients that specify the plurality of hash functions;

producing, using a processor, correspondence information that associates values of the plurality of hash coefficients that specify the plurality of hash functions and the plurality of data sets with each other; and producing, using a processor, a plurality of hash information corresponding to the plurality of data sets;

wherein the determining the plurality of hash functions includes:

calculating, for each of the data sets, a hash value using a candidate hash function based on keys of a plurality of data included in the data set and deciding whether or not all of the plurality of data can be stored into a first storage position specified based on the hash value or a second storage position contiguous to the first storage position; and determining the candidate hash function as the hash function corresponding to the data set with regard to which it is decided that all of the plurality of data can be stored into the first storage position or the second storage position; and the producing the plurality of hash information includes producing the hash information for the data set by storing, for each of the data sets, the data and the keys into the first storage position specified based on the hash value calculated using the hash function corresponding to the data set or the second storage position based on the keys of the plurality of data.

17. The data storage method according to claim 16, wherein the producing the correspondence information includes producing the correspondence information having an information amount which can be retained in a cache memory; and the producing the hash coefficient value information includes producing the hash coefficient value information having an information amount which can be retained in the cache memory.

18. The data storage method according to claim 16 wherein, in the determining the plurality of hash functions, where a key string $\{x_1, x_2, x_3, \ldots, x_n\}$ of data is represented as $x_K$ ($1 \leq K \leq n$), the hash function specified by a value of a hash coefficient R ($1 \leq R \leq 256$) and included in a function group represented by $f_R(x_K) = f_R(x_{K-1}) \times R + x_K$ [where $f_R(x_0) = R_0$ ($R_0$ is an initial value)] is used as the candidate hash function.

19. The data storage method according to claim 16, wherein the determining the plurality of hash functions includes determining, when two or more data sets are found with regard to which it is decided that all of the plurality of data can be stored in the first storage position or the second storage position, the candidate hash function as the hash function corresponding to two or more data sets; and the producing the correspondence information includes producing the correspondence information that associates a value of a hash coefficient that specifies one hash function and the two or more data sets with each other.

20. A data retrieval method, comprising:

specifying, using a processor, one hash information that stores one data set including retrieval target data based on a key of the retrieval target data from among a plurality of hash information that store a plurality of data sets obtained by dividing a data set;

acquiring, using a processor, a value of one hash coefficient that specifies, based on the key of the retrieval target data, one hash function corresponding to the one data set using correspondence information that associates the plurality of data sets and values of hash coefficients that specify a plurality of hash functions with each other, and hash coefficient value information including values of a plurality of hash coefficients that specify the plurality of hash functions;

calculating, using a processor, a hash value by the one hash function using the key of the retrieval target data and the value of the one hash coefficient;

reading out, using a processor, data and a key stored in a first storage position specified based on the hash value and a second storage position contiguous to the first storage position from the one hash information; and outputting, using a processor, when it is decided that the key read out from the first storage position or the second storage position coincides with the key of the retrieval target data, data associated with the key decided as the coincident key as the retrieval target data.

* * * * *